(12) United States Patent
Yamaki et al.

(10) Patent No.: US 11,299,851 B2
(45) Date of Patent: Apr. 12, 2022

(54) METHOD FOR PRODUCING PULP FIBERS TO BE SACCHARIFIED

(71) Applicant: Unicharm Corporation, Ehime (JP)

(72) Inventors: Kouichi Yamaki, Kanonji (JP); Naoto Ohashi, Kanonji (JP); Takayoshi Konishi, Kanonji (JP)

(73) Assignee: UNICHARM CORPORATION, Ehime (JP)

( * ) Notice: Subject to any disclaimer, the term of this patent is extended or adjusted under 35 U.S.C. 154(b) by 0 days.

(21) Appl. No.: 16/771,746

(22) PCT Filed: Dec. 20, 2017

(86) PCT No.: PCT/JP2017/045793
§ 371 (c)(1),
(2) Date: Jun. 11, 2020

(87) PCT Pub. No.: WO2019/123579
PCT Pub. Date: Jun. 27, 2019

(65) Prior Publication Data
US 2020/0399827 A1    Dec. 24, 2020

(51) Int. Cl.
*D21C 5/02* (2006.01)
*B09B 3/00* (2006.01)
*C08J 11/04* (2006.01)

(52) U.S. Cl.
CPC ............ *D21C 5/022* (2013.01); *B09B 3/0016* (2013.01); *C08J 11/04* (2013.01)

(58) Field of Classification Search
CPC .......... D21C 5/022; D21C 9/153; D21C 5/02; B09B 3/00; C13K 1/02; C08J 11/00; D21B 1/028; B29L 2031/4878; Y02W 30/52
See application file for complete search history.

(56) References Cited

U.S. PATENT DOCUMENTS

2015/0291762 A1* 10/2015 Watanabe ............... D21C 5/02
                                                              428/401
2015/0307908 A1* 10/2015 Quinlan ............. H01L 51/0074
                                                              435/125
2019/0118233 A1   4/2019 Konishi et al.

FOREIGN PATENT DOCUMENTS

EP   2891747 A1   7/2015
EP   3238840 A1   11/2017
(Continued)

OTHER PUBLICATIONS

English Abstract and Machine Translation for Japanese Publication No. JP 2001-047023A, published Feb. 20, 2001, 10 pgs.
(Continued)

*Primary Examiner* — Eric Hug
*Assistant Examiner* — Elisa H Vera
(74) *Attorney, Agent, or Firm* — Fredrikson & Byron, P.A.

(57) ABSTRACT

Provided is a method for producing pulp fibers to be saccharified, whereby it becomes possible to reduce the amount of a highly water-absorbable polymer and therefore increase the collection efficiency in the production of a saccharified solution when pulp fibers for a saccharified liquid is produced from a dirty absorbent article. The method is a method for producing pulp fibers to be saccharified, from pulp fibers in a dirty absorbent article. The method includes: a solid-liquid separation step (S18) of crushing up a highly water-absorbable polymer while separating an inactivated aqueous solution containing pulp fibers and the highly water-absorbable polymer both separated from a dirty absorbent article into a solid material (98) containing the pulp fibers and the highly water-absorbable polymer and a liquid material (E) containing the highly water-absorbable
(Continued)

polymer and the inactivated aqueous solution; and a removal step (S21) of washing away the remaining highly water-absorbable polymer by washing the separated solid pulp fibers in a solution or another means to produce pulp fibers to be saccharified.

7 Claims, 4 Drawing Sheets

(56) References Cited

FOREIGN PATENT DOCUMENTS

| | | | |
|---|---|---|---|
| JP | 2001047023 | A | 2/2001 |
| JP | 2009183221 | A | 8/2009 |
| JP | 2010036058 | A | 2/2010 |
| JP | 2013202021 | A | 10/2013 |
| JP | 5624694 | B2 | 11/2014 |
| JP | 2017128840 | A | 7/2017 |
| JP | 2017140619 | A | 8/2017 |
| JP | 2017189127 | A | 10/2017 |
| JP | 2017209675 | A | 11/2017 |
| WO | 2013077877 | A1 | 5/2013 |
| WO | 2017179252 | A1 | 10/2017 |

OTHER PUBLICATIONS

English Abstract and Machine Translation for Japanese Publication No. JP 2009-183221A, published Aug. 20, 2009, 12 pgs.
English Abstract and Machine Translation for Japanese Publication No. JP 2010-036058A, published Feb. 18, 2010, 43 pgs.
English Abstract and Machine Translation for Japanese Publication No. JP 5624694B2, published Nov. 12, 2014, 27 pgs.
PCT International Search Report dated Apr. 3, 2018 for Intl. App. No. PCT/JP2017/045793, from which the instant application is based, 2 pgs.
English Abstract and Machine Translation for Japanese Publication No. 2017-140619 A, published Aug. 17, 2017, 37 pgs.
English Abstract and Machine Translation for Japanese Publication No. 2013-202021 A, published Oct, 7, 2013, 14 pgs.
English Abstract and Machine Translation for Japanese Publication No. 2017-128840 A, published Jul. 27, 2017, 35 pgs.
English Abstract and Machine Translation for Japanese Publication No. 2017-209675 A, published Nov. 30, 2017, 33 pgs.
English Abstract and Machine Translation for Japanese Publication No. JP2017-189127A, published Oct. 19, 2017, 30 pgs.
Extended European Search Report for European Patent Application No. 17935608.4, dated Oct. 7, 2020, 23 pgs.
Caiyun Du et al., "Organic Chemistry," Wuhan University Press, Dec. 2015, pp. 297-298, with Partial English translation.

* cited by examiner

METHOD FOR PRODUCING PULP FIBERS TO BE SACCHARIFIED

RELATED APPLICATIONS

This application is a 35 U.S.C. 371 national phase filing from International Application No. PCT/JP2017/045793, filed Dec. 20, 2017, the contents of which are incorporated herein by reference.

FIELD

The present invention relates to a method of manufacturing pulp fibers for saccharification from pulp fibers of used absorbent articles.

BACKGROUND

Methods of obtaining saccharification solution from absorbent articles such as used disposable diapers, etc., are known. For example, in Patent literature 1, a saccharification method of cellulose containing waste which includes water absorbing polymers, for example, sanitary products such as used disposable diapers, etc., is disclosed. This method includes a process of disaggregating cellulose containing waste which includes water absorbing polymers, a process of obtaining a saccharification solution which includes glucose by treating the cellulose containing waste with an enzyme which includes at least cellulase, a process of salting out the water absorbing polymers by adding calcium chloride to the saccharification solution and stirring the same, and a process of removing the salted out water absorbing polymers.

CITATION LIST

Patent Literature

[PTL 1] Japanese Unexamined Patent Publication No. 2013-202021

SUMMARY

Technical Problem

In order to make the saccharification solution which is obtained from pulp fibers (including cellulose) of used absorbent articles more useful, it is important to reduce the concentration of superabsorbent polymers which are impurities of the saccharification solution and to improve the recovery efficiency of the saccharification solution. In the method of Patent literature 1, after the saccharification solution is generated from the used absorbent articles, the superabsorbent polymers included in the generated saccharification solution are removed, whereby the recovery efficiency of the saccharification solution which can be used are intended to be improved. However, since this method removes the superabsorbent polymers after the saccharification solution is generated, there is a risk that the superabsorbent polymers may adversely affect the saccharification reaction. In such a case, the saccharification solution may not be sufficiently generated, and superabsorbent polymers or impurities related thereto may be increased so that it may be difficult to be removed from the saccharification solution, whereby there is a possibility that the impurities of the saccharification solution cannot be reduced and the recovery efficiency cannot be improved. Accordingly, when generating a saccharification solution from used absorbent articles, there is room for improvement in reducing impurities of the saccharification solution and in improving the recovery efficiency.

The object of the present invention is to provide a method of manufacturing pulp fibers for saccharification in which the amount of superabsorbent polymers is small and which can improve the recovery efficiency when generating the saccharification solution, when manufacturing pulp fibers for saccharification solution from used absorbent articles.

Solution to Problem

The method of manufacturing pulp fibers for saccharification according to the present invention is as follows. (1) A method of manufacturing pulp fibers for saccharification from pulp fibers of used absorbent articles, comprising: a solid-liquid separation process of, while separating an inactivation aqueous solution which includes the pulp fibers and superabsorbent polymers which are separated from the used absorbent articles into a solid which includes the pulp fibers and the superabsorbent polymers, and a liquid which includes the superabsorbent polymers and the inactivation aqueous solution, squashing the superabsorbent polymers, and a removal process of manufacturing the pulp fibers for saccharification by washing within a liquid the pulp fibers in the separated solid and washing away the remaining superabsorbent polymers.

According to the present method, in the solid-liquid separation process, the superabsorbent polymers which have absorbed water in a gel-like (lumpy or substantially spherical) state remaining in the pulp fibers are squashed, whereby the superabsorbent polymers are thinned and subdivided so that it is easier to be removed from the pulp fibers. Accordingly, in the removal process, the superabsorbent polymers which remain in the pulp fibers can be relatively easily washed away by a liquid (for example: water). Therefore, the superabsorbent polymers can be efficiently reduced from the pulp fibers, whereby pulp fibers for saccharification in which the amount of superabsorbent polymers (impurities) is small and with high purity can be efficiently manufactured. By manufacturing the saccharification solution by using such pulp fibers for saccharification in which the amount of superabsorbent polymers is small, there is hardly a risk that the superabsorbent polymers may adversely affect the saccharification reaction, and it is not necessary to remove the superabsorbent polymers after the generation of the saccharification solution, and therefore the recovery efficiency of the saccharification solution can be improved.

The present method may be (2) the method according to the above-mentioned (1), wherein the solid-liquid separation process includes a squashing process of squashing the superabsorbent polymers which remain in the pulp fibers by treating the inactivation aqueous solution which includes the pulp fibers and the superabsorbent polymers by a pressure type dehydration method.

According to the present method, the superabsorbent polymers which remain in the pulp fibers are squashed by the pressure type dehydration method, whereby the solid-liquid separation and the squashing of the superabsorbent polymers on the pulp fibers can be performed simultaneously, efficiently, and reliably. That is, the present method thins and subdivides the superabsorbent polymers on the pulp fibers efficiently and reliably, whereby it is easier to be peeled off from the pulp fibers. Accordingly, the superabsorbent polymers can be reduced from the pulp fibers more efficiently.

The present method may be (3) the method according to the above-mentioned (1) or (2), further comprising a process of separating a portion of the superabsorbent polymers and the inactivation aqueous solution from the inactivation aqueous solution which includes the pulp fibers and the superabsorbent polymers before the solid-liquid separation process.

According to the present method, before the solid-liquid separation process, a certain amount of the superabsorbent polymers and the inactivation aqueous solution is separated from the inactivation aqueous solution which includes the pulp fibers and the superabsorbent polymers. Accordingly, the present method can suppress the proportion of the superabsorbent polymers in the inactivation aqueous solution to be supplied to the solid-liquid separation process to a low degree, whereby the superabsorbent polymers which may remain in the pulp fibers can be reduced before the solid-liquid separation process. Therefore, in the solid-liquid separation process, the superabsorbent polymers which are attached to the pulp fibers can be squashed more efficiently, and the treatment efficiency of removing the superabsorbent polymers from the pulp fibers can be improved.

The present method may be (4) the method according to any one of the above-mentioned (1) to (3), further comprising, before the solid-liquid separation process, a process of crushing the used absorbent articles within the inactivation aqueous solution, and a process of separating the inactivation aqueous solution which includes the pulp fibers and the superabsorbent polymers from the inactivation aqueous solution which includes crushed matter obtained by the process of crushing the used absorbent articles.

According to the present method, the inactivation aqueous solution which includes the pulp fibers and the superabsorbent polymers which are separated from the used absorbent articles, and is supplied in the solid-liquid separation process, is generated by the process of crushing and the process of separating. Accordingly, foreign matter (materials other than the pulp fibers and the superabsorbent polymers of the disposable absorbent articles (for example: films (such as the back sheet, etc.), nonwoven fabric (such as the top sheet, etc.), elastic bodies (such as rubbers for leakage prevention walls)) can be suppressed from being mixed into the inactivation aqueous solution. Therefore, the superabsorbent polymers can be squashed more accurately without being disturbed by foreign matter. As a result, the treatment efficiency of removing the superabsorbent polymers from the pulp fibers can be improved.

The present method may be (5) the method according to any one of the above-mentioned (1) to (4), wherein the removal process includes an oxidizing agent treatment process of removing the squashed superabsorbent polymers from the pulp fibers by treating the separated solid with an aqueous solution which includes an oxidizing agent.

According to the present method, in the solid-liquid separation process, the superabsorbent polymers in a gel-like (lumpy or substantially spherical) state remaining in the pulp fibers are squashed, whereby the superabsorbent polymers are thinned and subdivided so that the surface area of the superabsorbent polymers can be expanded, and the inside of the superabsorbent polymers in a lumpy or substantially spherical state can be exposed to the outer side. Accordingly, in the oxidizing agent treatment process, the contacting area of the superabsorbent polymers with the oxidizing agent can be increased for example by making the inside of the superabsorbent polymers which is difficult to come into contact with the oxidizing agent in the case of the superabsorbent polymers in a lumpy or substantially spherical state, come into contact with the oxidizing agent. Therefore, the oxidative decomposition of the superabsorbent polymers by the oxidizing agent can be proceeded more efficiently, whereby the superabsorbent polymers can be reduced from the pulp fibers more efficiently. Thus, pulp fibers for saccharification in which the amount of superabsorbent polymers (impurities) is small and with high purity can be manufactured more efficiently. It should be noted that as the oxidizing agent, ozone, chlorine dioxide, peracetic acid, sodium hypochlorite, hydrogen peroxide, etc., may be mentioned. Using an oxidizing agent can also perform sterilization, and thus is preferable.

The present method may be (6) the method according to the above-mentioned (5), wherein the oxidizing agent is ozone.

According to the present method, the oxidizing agent is ozone, whereby the oxidative decomposition of the superabsorbent polymers can be proceeded more strongly, and pulp fibers for saccharification in which the amount of superabsorbent polymers (impurities) is small and with high purity can be manufactured more efficiently. Further, effects such as sterilization, bleaching, and deodorization are brought by ozone, whereby impurities other than the superabsorbent polymers can be removed from the pulp fibers, and pulp fibers for saccharification with higher purity can be manufactured more efficiently.

The present method may be (7) the method according to any one of the above-mentioned (1) to (6), wherein the inactivation aqueous solution is an acidic aqueous solution. According to the present method, the inactivation aqueous solution is an acidic aqueous solution, whereby the superabsorbent polymers within the used absorbent articles can be reliably dehydrated, so as to have a predetermined particle diameter or smaller. Accordingly, in the solid-liquid separation process, while performing the solid-liquid separation easily, the superabsorbent polymers can be squashed. As a result, the superabsorbent polymers can be reduced from the pulp fibers more efficiently.

The present method may be (8) the method according to any one of the above-mentioned (1) to (7), further comprising, after the removal process, a saccharification process of manufacturing a saccharification solution by saccharifying the pulp fibers for saccharification.

According to the present method, the pulp fibers for saccharification which are manufactured at least by the above-mentioned solid-liquid separation process and the removal process are saccharified, whereby the saccharification solution is manufactured. That is, the saccharification solution is manufactured by using the pulp fibers for saccharification in which the amount of superabsorbent polymers (impurities) is small, whereby there is hardly a risk that the superabsorbent polymers may adversely affect the saccharification reaction, and it is not necessary to remove the superabsorbent polymers after the generation of the saccharification solution, and therefore the recovery efficiency of the saccharification solution can be improved.

Advantageous Effects of Invention

According to the present invention, pulp fibers for saccharification in which the amount of superabsorbent polymers is small and which can improve the recovery efficiency when generating the saccharification solution can be manufactured, when manufacturing pulp fibers for saccharification solution from used absorbent articles.

DESCRIPTION OF EMBODIMENTS

Figure 1:
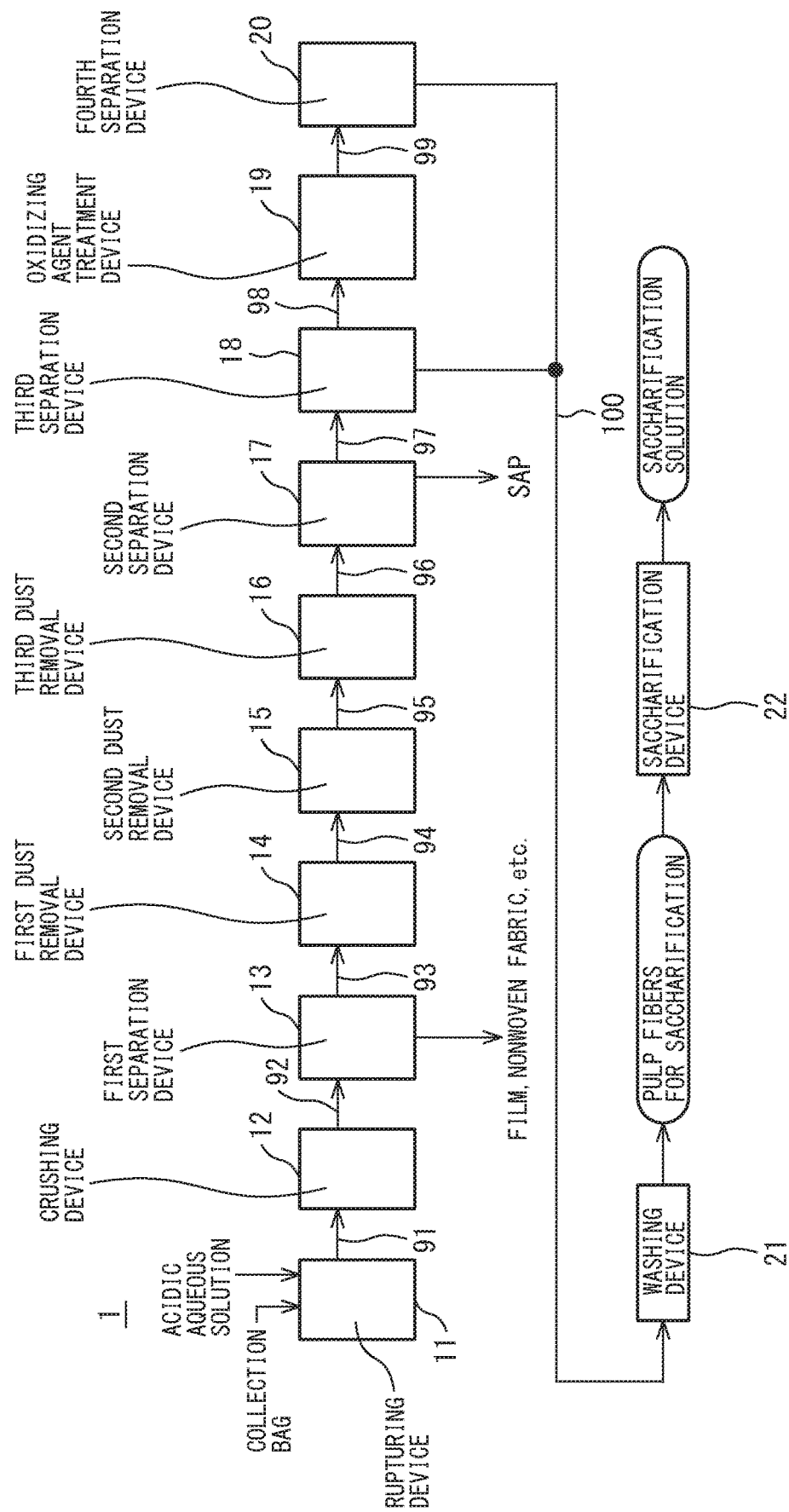
FIG. 1 is a block diagram showing an example of a system according to an embodiment.

Hereinbelow, the method and the apparatus of manufacturing pulp fibers for saccharification from pulp fibers of used absorbent articles, according to the embodiment is explained. It should be noted that a used absorbent article includes an absorbent article which has been used by a user and is in a state in which excrement of the user is absorbed and retained, and further includes an absorbent article which has been used and is in a state in which excrement is not absorbed or retained, and still further includes an absorbent article which has not been used and is discarded. As an absorbent article, for example, a diaper, a urine collection pad, a sanitary napkin, a bed sheet, a pet sheet, may be mentioned.

The configurational example of the absorbent article is explained. The absorbent article includes a top sheet, a back sheet, and an absorbent body which is arranged between the top sheet and the back sheet. As one example of the size of the absorbent article, a length of approximately 15 to 100 cm, and a width of 5 to 100 cm, may be mentioned. Incidentally, the absorbent article may include other members which are provided in general absorbent articles, for example, a diffusion sheet, a leakage prevention wall, etc.

As the configuration member of the top sheet, for example, a liquid permeable nonwoven fabric, synthetic resin film with liquid permeable holes, a composite sheet thereof, etc., may be mentioned. As the configuration member of the back sheet, for example, a liquid impermeable nonwoven fabric, a liquid impermeable synthetic resin film, a composite sheet thereof, etc., may be mentioned. As the configuration member of the diffusion sheet, for example, a liquid permeable nonwoven fabric, etc., may be mentioned. As the configuration member of the leakage prevention wall, for example, a liquid impermeable nonwoven fabric may be mentioned, and may include an elastic member such as rubber. The material of a nonwoven fabric or a synthetic resin film is not particularly limited as long as it can be used for an absorbent article. As such a material, for example, olefin-based resin such as polyethylene, polypropylene, etc., polyamide-based resin such as 6-nylon, 6,6-nylon, etc., polyester-based resin such as polyethylene terephthalate (PET), polybutylene terephthalate (PBT), etc., may be mentioned. In the present embodiment, an example of an absorbent article in which the configurational member of the back sheet is a film and the configurational member of the top sheet is a nonwoven fabric is explained.

As the configurational member of the absorbent body, absorbent materials, that is, pulp fibers and superabsorbent polymers may be mentioned. The pulp fibers are not particularly limited as long as they are fibers which are to be the materials of saccharification solution, and for example, cellulose-based fibers may be mentioned. As the cellulose-based fibers, for example, wood pulp, cross-linked pulp, non-wood pulp, regenerated cellulose, semi-synthetic cellulose, etc., may be mentioned. As the size of pulp fibers, the average value of a major axis of fibers of, for example, several tens of μm may be mentioned, and 20 to 40 μm is preferable, and the average value of fiber lengths of, for example, several mm may be mentioned, and 2 to 5 mm is preferable. The superabsorbent polymers (SAP) are not particularly limited as long as they can be used for an absorbent article, and for example, absorbent polymers of polyacrylate-based, polysulfonate-based, and maleic anhydride-based, may be mentioned. As the size of superabsorbent polymers (when dry), the average value of particle diameters of, for example, several hundreds of μm may be mentioned, and 200 to 500 μm is preferable. The pulp fibers for saccharification are manufactured from the above-mentioned pulp fibers of the used absorbent articles.

One surface and the other surface of the absorbent body are joined to the top sheet and the back sheet, respectively, through an adhesive agent. In a plan view, the portion which extends toward the outer side of the absorbent body so as to surround the absorbent body among the top sheet (the peripheral portion) is joined to the portion which extends toward the outer side of the absorbent body so as to surround the absorbent body among the back sheet (the peripheral portion), through an adhesive agent. Accordingly, the absorbent body is wrapped inside the joined body of the top sheet and the back sheet. The adhesive agent is not particularly limited as long as it can be used for an absorbent article, and for example, a hot melt-type adhesive agent may be mentioned. As a hot melt-type adhesive agent, for example, a pressure-sensitive or heat-sensitive adhesive agent of a rubber-based such as styrene-ethylene-butadiene-styrene, styrene-butadiene-styrene, styrene-isoprene-styrene, etc., or of olefin-based such as polyethylene, etc., may be mentioned.

Next, the method and the apparatus of manufacturing recycled pulp fibers from mixed matter of pulp fibers and superabsorbent polymers which is separated from a used absorbent article, according to the embodiment is explained. In the present embodiment, used absorbent articles are recovered or obtained from outside for the purpose of recycling, the mixed matter of pulp fibers and superabsorbent polymers is separated from the used absorbent articles which have been recovered, etc., and the separated mixed matter is used for the manufacturing of the recycled pulp fibers. At this time, a plurality of used absorbent articles are collected and encapsulated in bags for collection (hereinbelow, which are referred to as "collection bags") so that dirt and fungi of excrement do not leak outside, whereby are recovered, etc. Each of the used absorbent articles is in a state of being rolled or folded with the top sheet placed on the inner side, so that odor and excrement are not spread to the surroundings.

First, the system 1 which is used for the method of manufacturing recycled pulp fibers from mixed matter of pulp fibers and superabsorbent polymers which is separated from a used absorbent article is explained. The system 1 is a system which recovers pulp fibers from a used absorbent article, and thus is a system which manufactures recycled pulp fibers. FIG. 1 is a block diagram which shows one example of the system 1 according to the present embodiment. The system 1 includes the third separation device 18 and the washing device 21, and preferably further includes the rupturing device 11, the crushing device 12, the first separation device 13, the first dust removal device 14, the second dust removal device 15, the third dust removal device 16, the second separation device 17, the oxidizing agent treatment device 19, the fourth separation device 20, and the saccharification device 22.

The rupturing device 11 punches a hole in a collection bag in which used absorbent articles are encapsulated within the inactivation aqueous solution. The rupturing device 11 includes, for example, a solution tank, a stirring machine, and a crushing blade. The solution tank stores the inactivation aqueous solution. The stirring machine is provided inside the solution tank, stirs the inactivation aqueous solution, so that a swirling flow is generated. The crushing blade is provided on the lower portion of the solution tank, and punches a hole in the collection bags which are withdrawn to the lower side of the inactivation aqueous solution inside the solution tank by the swirling flow. It should be noted that the inactivation aqueous solution is an aqueous solution which inactivates the superabsorbent polymers. By the inactivation, the absorption performance of the superabsorbent polymers is lowered. As a result, the superabsorbent polymers releases water up to an amount acceptable by the absorption performance, that is, dehydrate. Hereinbelow, an example of a case in which an acidic aqueous solution is used as the inactivation aqueous solution is explained.

The crushing device 12 crushes the used absorbent articles within the acidic aqueous solution together with the collection bag which have sunk under the water surface of the acidic aqueous solution. The crushing device 12 includes, for example, a crushing portion and a pump. The crushing portion is connected to the solution tank, and the used absorbent articles inside the collection bag which have been delivered together with the acidic aqueous solution (the mixed solution 91) from the solution tank are crushed within the acidic aqueous solution together with the collection bag. As the crushing portion, a biaxial crushing device (for example: a biaxial rotation-type crushing machine, a biaxial differential-type crushing machine, a biaxial shear-type crushing machine) may be mentioned, and to be specific, a SUMICUTTER (manufactured by Sumitomo Heavy Industries Environment Co., Ltd.) may be mentioned. The pump is connected to the downstream side of the crushing portion, and withdraws the crushed matter which is obtained by the crushing portion together with the acidic aqueous solution (the mixed solution 92) from the crushing portion, and delivers the same to the subsequent process. Note that the crushed matter includes the pulp fibers, the superabsorbent polymers, and other materials (the materials of the collection bag, films, nonwoven fabric, elastic bodies, etc.).

The first separation device 13 stirs the mixed solution 92 which includes the crushed matter obtained by the crushing device 12 and the acidic aqueous solution, and while performing the washing so as to remove the dirt of the excrement, etc., from the crushed matter, separates the pulp fibers, the superabsorbent polymers and the acidic aqueous solution from the mixed solution 92 (the mixed solution 93), and delivers the same to the first dust removal device 14. As the first separation device 13, for example, a washing machine including a washing and dehydrating tank and a water tank surrounding the washing and dehydrating tank, may be mentioned, and to be specific, a horizontal-type washing machine ECO-22B (manufactured by Inamoto Co., Ltd.) may be mentioned. The washing and dehydrating tank (a rotating drum) is used as a washing and sieving tank (separating tank). The size of the plurality of penetrating holes provided in the peripheral surface of the washing tank is set, in a case of round holes, to a diameter of 5 to 20 mm$\phi$, and in a case of slits, a width of 5 to 20 mm.

The first dust removal device 14 separates the acidic aqueous solution (the mixed solution 93) which includes the pulp fibers and the superabsorbent polymers delivered from the first separation device 13 into the pulp fibers and the superabsorbent polymers within the acidic aqueous solution (the mixed solution 94) and the other materials (the foreign matter) by a screen which has a plurality of openings. Maintaining the pH of the acidic aqueous solution within a predetermined range is preferable from the viewpoint of inactivating (including the adjustment of the size and the specific gravity) of the superabsorbent polymers. The predetermined range is the range in which the variation of pH is within ±1.0, and the pH is adjusted by adding acidic solution, etc., if necessary. As the first dust removal device 14, for example, a screen separating machine may be mentioned, and to be specific, Pack Pulper (manufactured by Satomi Corporation), may be mentioned. The size of the openings of the screen (the sieve) is set, for example, in a case of round holes, to a diameter of 2 to 5 mm$\phi$, and in a case of slits, a width of 2 to 5 mm. Other materials (the foreign matter) of at least approximately 10 mm square or more can be removed.

The second dust removal device 15 separates the acidic aqueous solution (the mixed solution 94) which includes the pulp fibers and the superabsorbent polymers delivered from the first dust removal device 14 into the pulp fibers and the superabsorbent polymers within the acidic aqueous solution (the mixed solution 95) and the other materials (the foreign matter) by a screen which has a plurality of openings. It is preferable that the pH of the acidic aqueous solution is maintained in the above-mentioned predetermined range. As the second dust removal device 15, for example, a screen separating machine may be mentioned, and to be specific, Ramoscreen (manufactured by Aikawa Iron Works Co., Ltd.), may be mentioned. The size of the openings of the screen (the sieve) is set, for example, in a case of slits, to a width of 0.2 to 0.5 mm, and in a case of round holes, a diameter of 0.2 to 0.5 mm$\phi$. Other materials of at least approximately 3 mm square or more can be removed.

The third dust removal device 16 separates the acidic aqueous solution (the mixed solution 95) which includes the pulp fibers and the superabsorbent polymers delivered from the second dust removal device 15 into the pulp fibers and the superabsorbent polymers within the acidic aqueous solution (the mixed solution 96) and the other materials (the foreign matter with a larger specific gravity) by a centrifugal separation. It is preferable that the pH of the acidic aqueous solution is maintained in the above-mentioned predetermined range. As the third dust removal device 16, for example, a cyclone separating machine may be mentioned, and to be specific, ACT low concentration cleaner (manufactured by Aikawa Iron Works Co., Ltd.), may be mentioned. In order that the pulp fibers and the superabsorbent polymers within the acidic aqueous solution which have relatively smaller specific gravity is raised, and foreign matter which has larger specific gravity (such as metal, etc.) is made to descend, the acidic aqueous solution (the mixed solution 95) which includes the pulp fibers and the superabsorbent polymers is supplied into a conical housing placed in an up-side down manner of the third dust removal device 16 in a predetermined flow rate.

The second separation device 17 separates the acidic aqueous solution (the mixed solution 96) which includes the pulp fibers and the superabsorbent polymers delivered from the third dust removal device 16 into the pulp fibers within the acidic aqueous solution (the mixed solution 97) and the superabsorbent polymers within the acidic aqueous solution by a screen which has a plurality of openings. It should be noted that the superabsorbent polymers which could not be separated remain in the pulp fibers within the acidic aqueous solution of the mixed solution 97. As the second separation device 17, for example, a drum screen separating machine may be mentioned, and to be specific, a drum screen dehydrator (manufactured by Toyo Screen Co., Ltd.), may be mentioned. The size of the openings of the drum screen is set, for example, in a case of slits, to a width of 0.2 to 0.8 mm, and in a case of round holes, a diameter of 0.2 to 0.8 mmϕ. A considerable amount of superabsorbent polymers can be removed.

It should be noted that the rupturing device 11 to the second separation device 17 may be regarded as the devices of preparing the inactivation aqueous solution which includes pulp fibers and superabsorbent polymers. Incidentally, the devices of preparing the inactivation aqueous solution which includes pulp fibers and superabsorbent polymers are not limited to each of the devices mentioned-above, and may be other devices as long as the inactivation aqueous solution which includes pulp fibers and superabsorbent polymers can be obtained.

The third separation device 18, while separating the pulp fibers delivered from the second separation device 17, the superabsorbent polymers which have remained without being separated and the acidic aqueous solution (the mixed solution 97) into solid (the mixed matter 98) which includes the pulp fibers and the superabsorbent polymers and liquid which includes the superabsorbent polymers and the acidic aqueous solution by a screen which has a plurality of openings, applies pressure to the solid so as to squash the superabsorbent polymers in the solid. Note that the solid includes a slight amount of the acidic aqueous solution.

Figure 2:
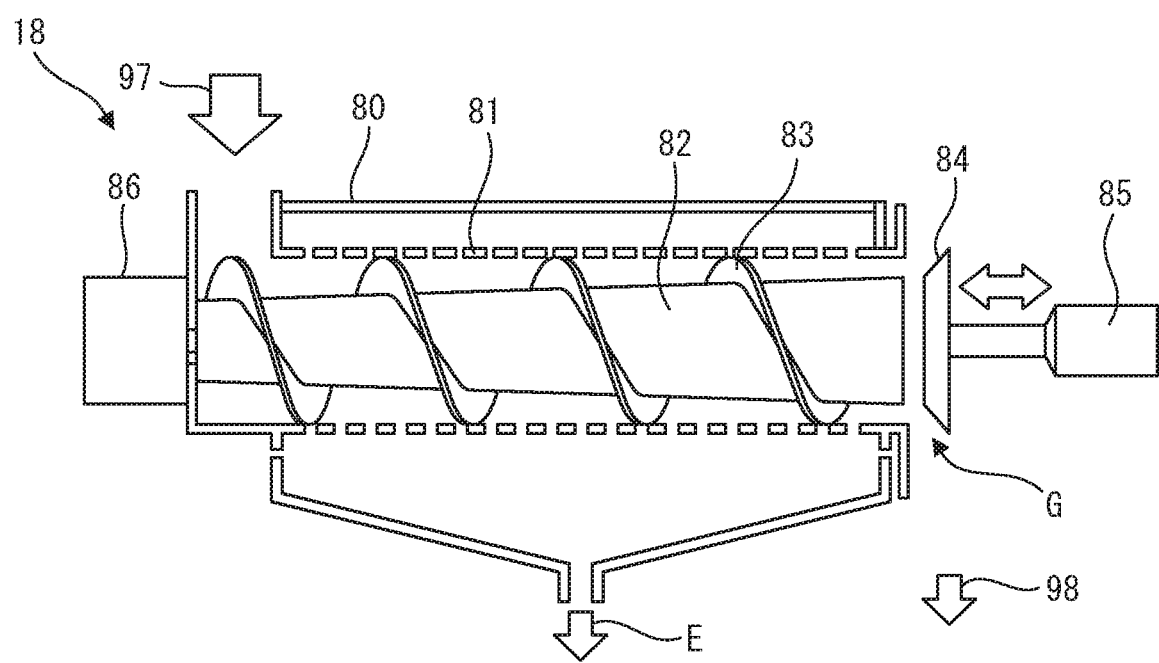
FIG. 2 is a schematic diagram showing a configurational example of the third separation device of FIG. 1.

FIG. 2 is a schematic diagram which shows a configurational example of the third separation device of FIG. 1. As the third separation device 18, for example, a screw press dehydrating machine may be mentioned. The third separation device 18 includes, for example, the drum screen 81, the screw shaft 82, the screw blades 83, the driving device 86, the lid body 84, and the pressure adjustment device 85. The drum screen 81 is a cylindrical screen (sieve) which is provided inside the housing 80. The screw shaft 82 extends along the axis of the cylinder of the drum screen 81, and the diameter thereof gradually increases toward the tip portion of the drum screen 81. The screw blades 83 are spirally provided outside the screw shaft 82 and rotate along the inner peripheral surface of the drum screen 81. The pitch of the screw blades 83 may be gradually narrowed toward the tip portion of the drum screen 81. The driving device 86 rotates the screw shaft 82. The lid body 84 is provided so as to close the tip portion of the drum screen 81. The pressure adjustment device 85 adjusts the pressure with which the lid body 84 is pressed against the tip portion of the drum screen 81. Note that the size of the openings of the drum screen (sieve) is set, for example, in a case of slits, to a width of 0.1 to 0.5 mm, and in a case of round holes, a diameter of 0.1 to 0.5 mmϕ. The third separation device 18, while delivering the liquid E which includes the superabsorbent polymers and the acidic aqueous solution from the slits on the side surface of the drum screen 81, delivers the solid (the mixed matter 98) which includes the pulp fibers and the superabsorbent polymers from the gap G between the tip portion of the drum screen 81 and the lid body 84. When the solid (the mixed matter 98) is delivered, the superabsorbent polymers are squashed by the lid body 84. As the pressure which is applied to the lid body 84, for example, 0.01 MPa or more and 1 MPa or less, may be mentioned. As the third separation device 18, a screw press dehydrator (manufactured by Kawaguchi Seiki Co., Ltd.), may be mentioned.

The oxidizing agent treatment device 19 treats the pulp fibers which include the squashed superabsorbent polymers in the solid delivered from the third separation device 18 (the mixed matter 98) with an aqueous solution (the treatment solution) which includes a gaseous substance which decomposes the superabsorbent polymers so as to be able to dissolve (for example, an oxidizing agent). Accordingly, the oxidizing agent treatment device 19 performs oxidative decomposition for the superabsorbent polymers so as to dissolve into the treatment solution and be removed from the pulp fibers, and delivers the pulp fibers which do not include the superabsorbent polymers together with the treatment solution (the mixed solution 99).

Figure 3:
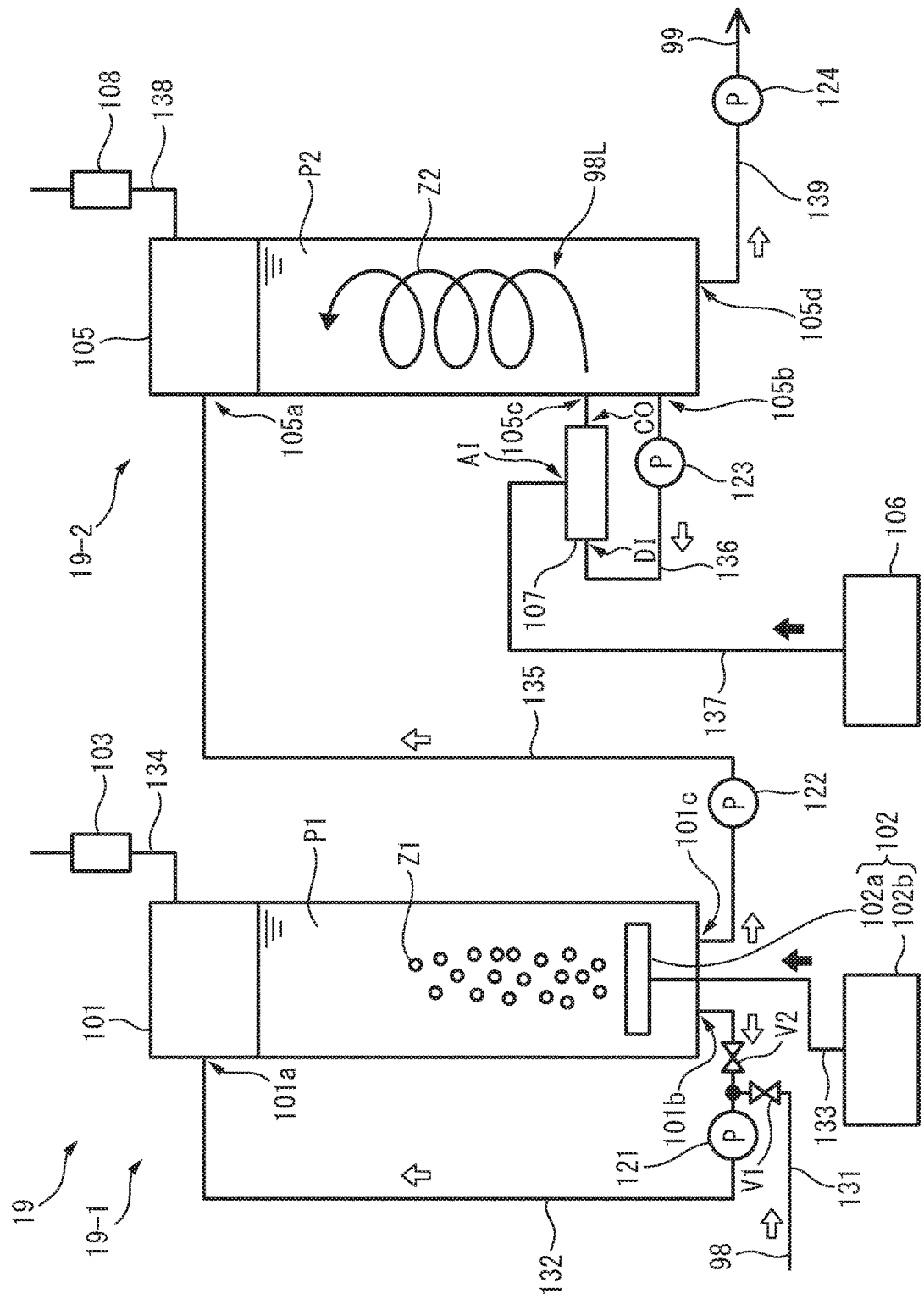
FIG. 3 is a schematic diagram showing a configurational example of the oxidizing agent treatment device of FIG. 1.

FIG. 3 is a schematic diagram which shows a configurational example of the oxidizing agent treatment device 19. The oxidizing agent treatment device 19 includes the pre-treatment device 19-1 and the treatment device 19-2. The pretreatment device 19-1 removes at least a portion of the superabsorbent polymers from the pulp fibers of the mixed matter 98. Accordingly, the pretreatment device 19-1 makes the viscosity of the pulp fibers which includes the superabsorbent polymers of the mixed matter 98 be lowered. The treatment device 19-2 further removes the superabsorbent polymers from the pulp fibers of the mixed matter 98 in which at least a portion of the superabsorbent polymers is removed and the viscosity is lowered by the pretreatment device 19-1.

The pretreatment device 19-1 includes the pretreatment tank 101, the gaseous substance emission device 102, the pump 122 (the pretreatment solution transfer portion), the pump 121 (the pretreatment solution circulation portion), and the gaseous substance decomposition device 103.

The pretreatment tank 101 is the tank which includes the pretreatment solution P1. The pretreatment solution P1 is, for example, initially water, and as the treatment of the pre-treatment device 19-1 proceeds, the gaseous substance for pretreatment Z1 (which will be described later) may dissolve therein, or the gaseous substance Z1 may be dissolved therein in advance. The gaseous substance emission device 102 is the device for emitting the gaseous substance for pretreatment Z1 into the pretreatment solution P1 inside the pretreatment tank 101, and includes the gaseous substance emission portion 102a and the gaseous substance generation portion 102b. The gaseous substance generation portion 102b generates the gaseous substance for pre-treatment Z1 which decomposes the superabsorbent polymers so as to dissolve into the pre-treatment solution P1. The gaseous substance Z1 is a gaseous substance which includes an oxidizing agent, and as such an oxidizing agent, for example, a gaseous ozone, chlorine dioxide, may be mentioned, and the oxidizing agent is preferably ozone from the viewpoint of the oxidizing power, etc. The gaseous substance emission portion 102a is provided inside the pre-treatment tank 101, and in the pretreatment solution P1, emits the gaseous substance for pretreatment Z from below the mixed matter 98 toward the mixed matter 98 (the pulp fibers which includes the superabsorbent polymers) which is present within the pretreatment solution P1 separate from the bottom portion of the pretreatment tank 101. The gaseous substance Z1 is emitted, for example, in a state of a number of fine bubbles. Accordingly, the superabsorbent polymers of the mixed matter 98 are oxidatively decomposed, and dissolve into the pretreatment solution P1, so as to be reduced. That is, the superabsorbent polymers of the pulp fibers are reduced, and the viscosity of the pulp fibers which include the superabsorbent polymers is reduced. Incidentally, the oxidizing agent need not be gas, and may be a liquid or a solid which is melted in a liquid, and as such an oxidizing agent, for example, peracetic acid, sodium hypochlorite, hydrogen peroxide, may be mentioned. In such a case, the gaseous substance emission portion 102a emits the liquid in which the oxidizing agent is melted.

The pump 122 (the pretreatment solution transfer portion) is provided in the middle of the pipe 135 which connects the delivery port 101c which is provided at the lower portion of the pretreatment tank 101 and the supply port 105a which is provided at the upper portion of the treatment tank 105 (which is described later) of the treatment device 19-2. The pump 122 extracts at least a portion of the pretreatment solution P1 which includes the mixed matter 98 in which the superabsorbent polymers are reduced in the pretreatment tank 101 from the lower portion of the pretreatment tank 101, and transfers the extracted pretreatment solution P1 from the upper portion of the treatment tank 105 to the treatment solution P2.

The pump 121 (the pretreatment solution circulation portion) is provided in the middle of the pipe 132 which connects the delivery port 101b which is provided at the lower portion of the pretreatment tank 101 and the supply port 101a which is provided at the upper portion of the pretreatment tank 101. The pump 121 extracts at least a portion of the pretreatment solution P1 which includes the mixed matter 98 from the lower portion of the pretreatment tank 101, and supplies the extracted pretreatment solution P1 from the upper portion of the pretreatment tank 101 to the pretreatment solution P1. Incidentally, the pump 121 receives the aqueous solution in which the mixed matter 98 and water are mixed through the pipes 131, 132, and supplies the received aqueous solution from the supply port 101a to the pretreatment tank 101 through the pipe 132. The distribution of liquid through the pipes 131, 132 is controlled by the valve V1 of the pipe 131 and the valve V2 of the pipe 132. The gaseous substance decomposition device 103 receives the gaseous substance Z1 which is accumulated in the upper portion of the pre-treatment tank 101 through the pipe 134, decomposes, detoxifies, and releases the gaseous substance to the outside.

Incidentally, the pretreatment solution P1 inside the pretreatment tank 101 is initially only the pretreatment solution P1, and after the treatment begins, the pretreatment solution P1 is to be a liquid in which the pretreatment solution P1, the mixed matter 98 and the gaseous substance for pretreatment Z1 are mixed, and in the present embodiment, the liquid inside the pretreatment tank 101, including such mixed liquid, is regarded as the pretreatment solution P1.

The treatment device 19-2 includes the treatment tank 105, the gaseous substance supply device 106, the ejector 107, the pump 123, the pump 124, and the gaseous substance decomposition device 108.

The treatment tank 105 is the tank which includes the treatment solution P2, and preferably has a cylindrical shape from the viewpoint that it is easier for the mixed solution 98L (which is described later) which is discharged from the ejector 107 to make a swirling flow occur in the treatment solution P2. The treatment solution P2 is, for example, initially water, and as the treatment of the treatment device 19-2 proceeds, the gaseous substance for treatment Z2 (which will be described later) may dissolve therein, and as the treatment of the pretreatment device 19-1 proceeds, the pretreatment solution P1 which includes the mixed matter 98 (superabsorbent polymers and pulp fibers) is included therein. Alternatively, the gaseous substance Z2 may be dissolved therein in advance. The gaseous substance supply device 106 generates the gaseous substance Z2 which decomposes the superabsorbent polymers so as to be able to dissolve into the treatment solution P2, and supplies the generated gaseous substance Z2 to the ejector 107. The gaseous substance Z2 is similar to the gaseous substance Z1, but may be different in types of the substance. The pump 123 supplies the aqueous solution which includes the mixed matter 98 of superabsorbent polymers and pulp fibers to the ejector 107. The pump 123 is provided in the middle of the pipe 136, and the pipe 136 connects the delivery port 105b which is provided at the lower portion of the treatment tank 105 and the supply port 105c which is provided at the lower portion of the treatment tank 105 and above the delivery port 105b. The pipe 136 in the vicinity of the supply port 105c is preferably tilted upwards from the viewpoint that it is easier for the mixed solution 98L which is discharged from the ejector 107 to make a swirling flow formed in the treatment solution P2 be raised.

The ejector 107 (the aspirator) is provided in the middle of the pipe 136, and includes the drive fluid supply port DI, the suction fluid supply port AI, and the mixed fluid discharge port CO. The ejector 107 makes the drive fluid flow from the drive fluid supply port DI to the mixed fluid discharge port CO, makes the narrowed portion in the middle of the flow path be in a state in which the pressure is reduced by the Venturi effect, draws the suction fluid from the suction fluid supply port AI to the narrowed portion so as to be mixed with the drive fluid, and discharges the same as the mixed fluid from the mixed fluid discharge port CO. In this configuration, the treatment solution P2 which includes superabsorbent polymers and pulp fibers (the mixed matter) in the treatment tank 105 is supplied to the drive fluid supply port DI and is flowed toward the mixed fluid discharge port CO by the pump 123. Accompanied therewith, the gaseous substance Z2 from the gaseous substance supply device 106 is suctioned to the inside of the ejector 107 from the suction fluid supply port AI. Accordingly, the treatment solution P2 which includes superabsorbent polymers and pulp fibers and the gaseous substance Z2 are mixed, and are discharged to the treatment tank 105 from the mixed fluid discharge port CO as the mixed solution 98L. The discharged mixed solution rotates inside the treatment tank 105 while the superabsorbent polymers are oxidatively decomposed by the gaseous substance Z2 so as to be removed, and is raised upwards gradually while stirring the treatment solution P2. The pump 124 is provided in the middle of the pipe 139 which connects the delivery port 105d which is provided at the lower portion of the treatment tank 105 and the equipment at the later stage (which is not shown). The pump 124 extracts at least a portion of the treatment solution P2 which includes the mixed matter 98 in which the superabsorbent polymers are removed in the treatment tank 105 from the lower portion of the treatment tank 105, and transfers the extracted treatment solution P2 to the equipment at the later stage. The gaseous substance decomposition device 108 receives the gaseous substance Z2 which is accumulated in the upper portion of the treatment tank 105 through the pipe 138, decomposes, detoxifies, and releases the gaseous substance Z2 to the outside.

Incidentally, the treatment solution P2 inside the treatment tank 105 is initially only the treatment solution P2, and after the treatment begins, the treatment solution P2 is to be a liquid in which the treatment solution P2, the mixed matter and the gaseous substance are mixed, and in the present embodiment, the liquid inside the treatment tank 105, including such mixed liquid, is regarded as the treatment solution P2.

In the oxidizing agent treatment device 19, the reason why both the pretreatment device 19-1 and the treatment device 19-2 are used is as follows. From the viewpoint of the treatment efficiency, it is preferable to use only the treatment device 19-2 which includes the ejector 107. However, in the aqueous solution which includes the mixed matter 98, which is supplied to the oxidizing agent treatment device 19, when the concentration of the superabsorbent polymers attached to the pulp fibers is high, it is conceivable that the viscosity of the mixed matter 98 is increased, and the ejector 107 is clogged. Accordingly, in order to deal with such an issue, in the present embodiment, first, the aqueous solution which includes the mixed matter 98 is treated by the pretreatment device 19-1, whereby the viscosity of the mixed matter 98 is lowered to a degree so that the ejector 107 is not clogged. That is, the superabsorbent polymers are reduced.

Subsequently, the fourth separation device 20 separates the treatment solution which includes the pulp fibers treated by the oxidizing agent treatment device 19 (the mixed solution 99) by a screen which has a plurality of openings, into the treatment solution and the pulp fibers (the mixed matter 100). As the fourth separation device 20, for example, a screen separating machine may be mentioned. The size of the openings of the screen (the sieve) of the screen separating machine is set, for example, in a case of slits, to a width of 0.2 to 0.8 mm, and in a case of round holes, a diameter of 0.2 to 0.8 mmϕ.

Subsequently, the washing device 21 washes, for example, rinses, the separated pulp fibers (the mixed matter 100) within a liquid (for example: water) so as to wash away the impurities attached to the pulp fibers, whereby generates recycled pulp fibers, that is, pulp fibers for saccharification. It should be noted that the washing device 21 may wash, etc., the solid (the mixed matter 98) which includes pulp fibers which is obtained by the third separation device 18, in a liquid, without going through the oxidizing agent treatment device 19 and the fourth separation device 20. The superabsorbent polymers are attached to the pulp fibers obtained by the third separation device 18. However, since such superabsorbent polymers are squashed, the superabsorbent polymers can mostly be removed from the pulp fibers by the washing, etc. Accordingly, the washing device 21 washes, etc., the solid (the mixed matter 98) which includes pulp fibers obtained by the third separation device 18 within a liquid so as to wash away the superabsorbent polymers, whereby generates recycled pulp fibers, that is, pulp fibers for saccharification. The washing, etc., includes a relative movement of the pulp fibers within a liquid, such as the immersing in the liquid, and the rinsing, etc.

The saccharification device 22 saccharifes the recycled pulp fibers, that is the pulp fibers for saccharification, so as to generate the saccharification solution, after the washing device 21. The saccharification device 22 is not particularly limited, and includes a device which implements the saccharification method publicly known in the technical field.

Figure 4:
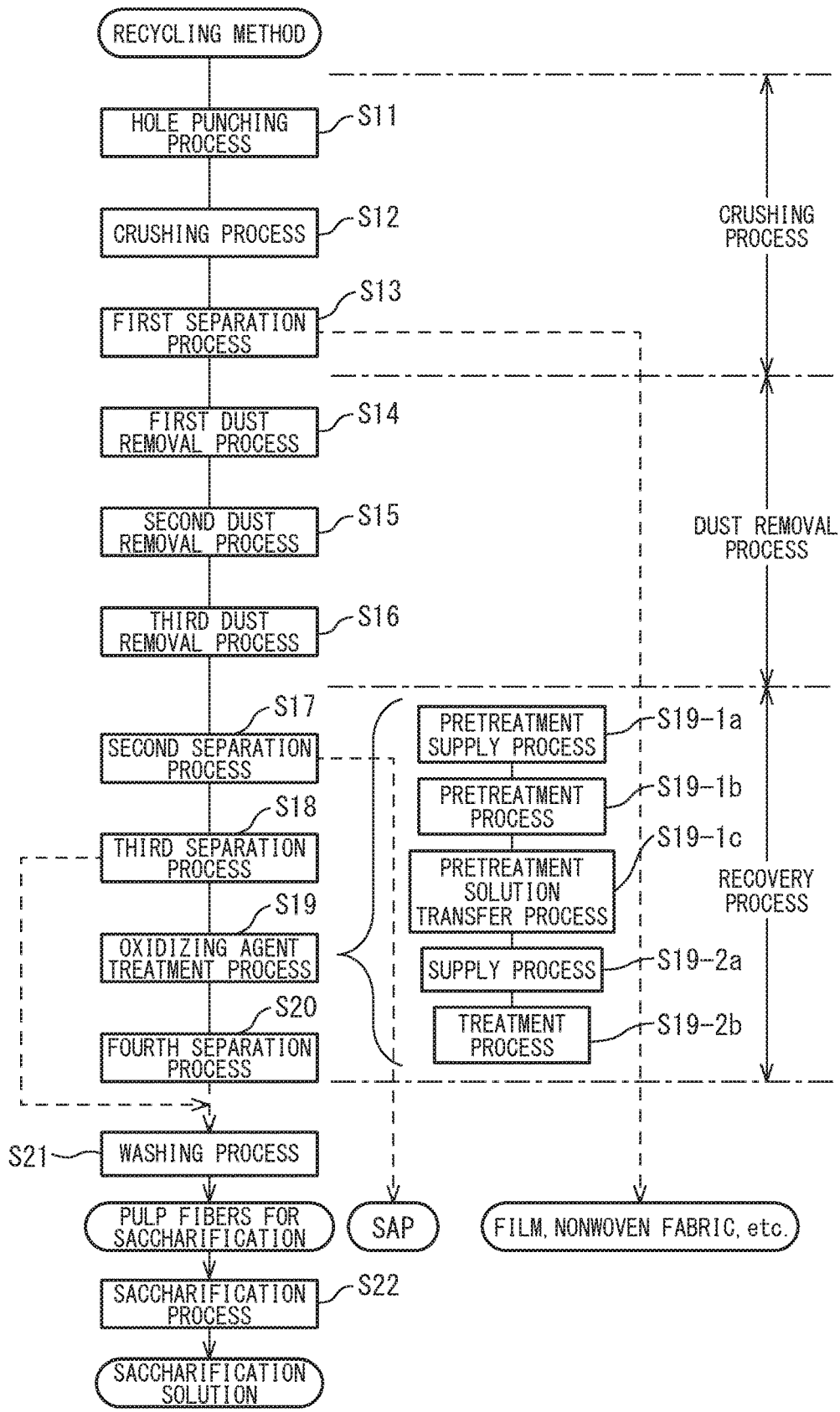
FIG. 4 is a flowchart showing an example of a method according to the embodiment.

Next, the method of manufacturing recycled pulp fibers from the mixed matter of pulp fibers and superabsorbent polymers which is separated from a used absorbent article is explained. This method is a method which recovers pulp fibers from a used absorbent article, and thus is a method which generates recycled pulp fibers. FIG. 4 is a flow chart which shows one example of the method according to the present embodiment. This method includes the third separation process S18 and the washing process S21, and preferably includes the hole punching process S11, the crushing process S12, the first separation process S13, the first dust removal process S14, the second dust removal process S15, the third dust removal process S16, the second separation process S17, the oxidizing agent treatment process S19, the fourth separation process S20, and the saccharification process S22.

The hole punching process S11 is performed by the rupturing device 11. The collection bags in which the used absorbent articles are encapsulated are thrown into the solution tank in which the acidic aqueous solution is stored, and a hole is punched in the surface of the collection bag which comes into contact with the acidic aqueous solution. When the hole is punched in the collection bag, the acidic aqueous solution surrounds and seals the collection bag so that the dirt, fungi and odor of the used absorbent articles inside the collection bag are not released outside. When the acidic aqueous solution enters inside the collection bag from the hole, the gas inside the collection bag exits to the outside of the collection bag, the specific gravity of the collection bag is to be larger than that of the acidic aqueous solution, and the collection bag sinks more deeply inside the acidic aqueous solution of the solution tank. Further, the acidic aqueous solution inactivates the superabsorbent polymers inside the used absorbent articles inside the collection bag.

The superabsorbent polymers inside the used absorbent articles are inactivated and the absorption performance thereof is reduced, whereby the superabsorbent polymers are dehydrated and the particle diameter is decreased. As a result, the handling of the pulp fibers which include superabsorbent polymers at each of the subsequent processes becomes easier and the treatment efficiency is improved. The reason why the acidic aqueous solution (an aqueous solution of inorganic acid or organic acid) is used as the inactivation aqueous solution is that, in comparison with a case in which an aqueous solution of lime or calcium chloride is used, ash content is less likely to remain in the pulp fibers, and further, it is easier to adjust the degree of inactivation (the particle diameter and the degree of specific gravity) by pH. As the pH of the acidic aqueous solution, 1.0 or higher and 4.0 or lower is preferable, and 1.2 or higher and 2.5 or lower is more preferable. When the pH is too high, the absorption performance of the superabsorbent polymers cannot be sufficiently lowered, and the sterilization performance may be lowered. When the pH is too low, there is a risk of corrosion in the equipment, and a large amount of alkaline chemicals are to be required for neutralization treatment during wastewater treatment. Especially, in order to separate the pulp fibers and the superabsorbent polymers from the other materials, it is preferable that the size and the specific gravity of the pulp fibers and those of the superabsorbent polymers are relatively similar to each other. Accordingly, by setting the pH of the acidic aqueous solution to 1.0 or higher and 4.0 or lower, the superabsorbent polymers can be made to be even smaller by the inactivation, whereby the size and the specific gravity of the pulp fibers and those of the superabsorbent polymers can be made to be relatively similar to each other. As the organic acid, for example, citric acid, tartaric acid, gluconic acid, glycolic acid, malic acid, etc., may be mentioned, and hydroxycarbonate-based organic acid such as citric acid, etc., is especially preferable. By the chelating effect of citric acid, metal ions, etc., in the excrement can be trapped and removed, and further, by the washing effect of citric acid, high level of dirt removal effect can be expected. On the other hand, as the inorganic acid, for example, sulfuric acid, hydrochloric acid, and nitric acid, may be mentioned, and from the viewpoint of not including chlorine, and the cost, etc., sulfuric acid is preferable. Since pH varies depending on the water temperature, the pH in the present invention is referred to as the pH when measured at an aqueous solution temperature at 20° C. The organic acid concentration of the organic acid aqueous solution is not particularly limited, and in a case in which the organic acid is citric acid, 0.5 mass % or higher and 4 mass % or lower is preferable. The inorganic acid concentration of the inorganic acid aqueous solution is not particularly limited, and in a case in which the inorganic acid is sulfuric acid, 0.1 mass % or higher and 0.5 mass % or lower is preferable.

The crushing process S12 is performed by the crushing device 12. While the acidic aqueous solution which includes the collection bag in which a hole is punched and is sunk under the water surface of the acidic aqueous solution, that is the mixed solution 91, is being discharged from the solution tank, the used absorbent articles inside the collection bag are crushed together with the collection bag within the acidic aqueous solution. Further, the acidic aqueous solution (the mixed solution 92) which includes the crushed matter obtained by the crushing portion is withdrawn from the crushing portion by the pump, and is delivered to the subsequent process.

The crushing process S12, preferably crushes the used absorbent articles together with the collection bag so that the average value of the size of the crushed matter is 5 cm or larger and 10 cm or smaller. As the absorbent article, a length of approximately 15 cm to 100 cm and a width of 10 cm to 100 cm is assumed. By crushing the crushed matter so that the average value of the size of the crushed matter is to be 5 cm or larger and 10 cm or smaller, a slit can be reliably provided in the back sheet and/or the top sheet of each of the used absorbent articles. Accordingly, substantially all pulp fibers can be extracted from the slit in each of the used absorbent articles, whereby the recovery rate of the pulp fibers (the total amount of pulp fibers to be regenerated/the total amount of pulp fibers in the supplied used absorbent articles) can be improved. When the average value of the size is set to less than 5 cm, materials other than the pulp fibers (for example: films (such as the material of the collection bag, the back sheet, etc.), nonwoven fabric (such as the top sheet, etc.), elastic bodies (such as rubbers for leakage prevention walls)) are cut into too small sizes, whereby it is difficult for such materials to be separated from the pulp fibers in the subsequent processes, and the recovery rate of the pulp fibers is to be reduced. On the other hand, when the average value of the size is set to be larger than 10 cm, it is difficult to apply a slit in the used absorbent articles, and the recovery rate of the pulp fibers is to be reduced.

The first separation process S13 is performed by the first separation device 13. The mixed solution 92 which includes the crushed matter and the acidic aqueous solution obtained by the crushing device 12 is stirred, and while the washing to remove dirt from the crushed matter is performed, the mixed solution 92 is separated into the pulp fibers, the superabsorbent polymers and the acidic aqueous solution, and other materials. As a result, the pulp fibers, the superabsorbent polymers and the acidic aqueous solution (partially including the other materials, etc.) among the mixed solution 92 are separated by passing through the penetration hole, so as to be delivered from the first separation device 13 (the mixed solution 93). The other materials except the pulp fibers, the superabsorbent polymers and the acidic aqueous solution among the mixed solution 92 cannot pass through the penetration hole, and remain inside the first separation device 13 or is delivered through another route.

The present method (the system) includes, in the crushing process which crushes the used absorbent articles (the hole punching process S11 (the rupturing device 11) to the first separation process S13 (the first separation device 13)), at least the hole punching process S11 (the rupturing device 11) and the crushing process S12 (the crushing device 12). Accordingly, the used absorbent articles in a state of being placed in the collection bag are crushed together with the collection bag within the inactivation aqueous solution, whereby dirt and fungi are hardly mixed into the inactivation aqueous solution and odor is hardly produced at least until the initiation of the crushing. Further, even if dirt and fungi are mixed into the inactivation aqueous solution and odor is produced when the used absorbent articles are crushed, at almost the same time as the crushing, the inactivation aqueous solution into which the dirt and fungi are mixed is delivered from the solution tank together with the crushed matter, whereby the inactivation aqueous solution can be washed away with the dirt and fungi hardly remaining in the solution tank. In addition, since odor can be sealed by the inactivation aqueous solution, the production of odor can also be suppressed to a lower degree. Accordingly, when crushing used absorbent articles, dirt and fungi can be suppressed from being scattered and odor can be suppressed from being released.

Incidentally, the used absorbent articles may not be crushed together with the collection bag within the inactivation aqueous solution and may be crushed together with the collection bag within gas (for example: air). In such a case, the hole punching process S11 is not necessary, and the crushing process S12 performs the crushing in the air in a state in which the inactivation aqueous solution is not present. Thereafter, the inactivation aqueous solution is supplied to the first separation process S13 together with the crushed matter of the crushing process S12.

Subsequently, the first dust removal process S14 is performed by the first dust removal device 14. While the acidic aqueous solution which includes the pulp fibers and the superabsorbent polymers delivered from the first separation device 13, that is, the mixed solution 93 maintains pH within the predetermined range, the mixed solution 93 is separated into the acidic aqueous solution which includes the pulp fibers and the superabsorbent polymers and the other materials by a screen. As a result, the pulp fibers, the superabsorbent polymers and the acidic aqueous solution (partially including the other materials, etc.) among the mixed solution 93 are separated by passing through the screen, and are delivered from the first dust removal device 14 (the mixed solution 94). The other materials except the pulp fibers, the superabsorbent polymers and the acidic aqueous solution among the mixed solution 93 cannot pass through the screen, and remain inside the first dust removal device 14 or are delivered through another route. As the concentration of the total of the pulp fibers and the superabsorbent polymers within the acidic solution, for example, 0.1 mass % or more and 10 mass % or smaller may be mentioned, and the same is preferably 0.1 mass % or more and 5 mass % or smaller. Further, the ratio of the pulp fibers to the superabsorbent polymers within the acidic solution is, for example, 50 to 90 mass %: 50 to 10 mass %.

Incidentally, it is preferable that the acidic aqueous solution is adjusted with pH at least by the first dust removal process S14, so that the differences between the specific gravity and the size of the superabsorbent polymers and the specific gravity and the size of the pulp fibers are within a predetermined range, and the pH is maintained until the third separation process S18. The predetermined range is, for example, a range in which one is within 0.2 to 5 times as much as the other. In such a case, the processes before the first dust removal process S14 can be regarded as an inactivation process of inactivating the superabsorbent polymers by mixing the acidic aqueous solution which is adjusted with pH so that the differences between the specific gravity and the size of the superabsorbent polymers and the specific gravity and the size of the pulp fibers are within a predetermined range, the pulp fibers and the superabsorbent polymers.

The second dust removal process S15 is performed by the second dust removal device 15. While the acidic aqueous solution which includes the pulp fibers and the superabsorbent polymers delivered from the first dust removal device 14, that is, the mixed solution 94 maintains pH within the predetermined range, the mixed solution 94 is separated into the acidic aqueous solution which includes the pulp fibers and the superabsorbent polymers and the other materials by a screen. As a result, the pulp fibers, the superabsorbent polymers and the acidic aqueous solution (partially including the other materials, etc.) among the mixed solution 94 are separated by passing through the screen, and are delivered from the second dust removal device 15 (the mixed solution 95). The other materials except the pulp fibers, the superabsorbent polymers and the acidic aqueous solution among the mixed solution 94 cannot pass through the screen, and remain inside the second dust removal device 15 or is delivered through another route.

The third dust removal process S16 is performed by the third dust removal device 16. While the acidic aqueous solution which includes the pulp fibers and the superabsorbent polymers delivered from the second dust removal device 15, that is, the mixed solution 95 maintains pH within the predetermined range, the mixed solution 95 is subjected to a centrifugal separation by a conical housing placed in an up-side down manner and is separated into the pulp fibers and the superabsorbent polymers within the acidic aqueous solution and the other materials (the foreign matter with a larger weight). As a result, the pulp fibers, the superabsorbent polymers and the acidic aqueous solution among the mixed solution 95 are delivered from the upper portion of the third dust removal device 16 (a cyclone separating machine) (the mixed solution 96). On the other hand, the other materials with a large specific gravity except the pulp fibers, the superabsorbent polymers and the acidic aqueous solution among the mixed solution 95, such as metal, are delivered from the lower portion of third dust removal device 16 (a cyclone separating machine).

The present method (the system) includes, in the dust removal process of removing foreign matter (other materials) (the first dust removal process S14 (the first dust removal device 14) to the third dust removal process S16 (the third dust removal device 16)), at least the second dust removal process S15 (the second dust removal device 15) and the third dust removal process S16 (the third dust removal device 16). Accordingly, the pulp fibers and superabsorbent polymers can be easily separated by the size from mainly the resin materials among the other materials of the used absorbent articles except the pulp fibers and superabsorbent polymers (the second dust removal process S15 (the second dust removal device 15)), and can be easily separated by the specific gravity from materials with a large specific gravity among the other materials, such as metal materials (the third dust removal process S16 (the third dust removal device 16)). Further, thereafter, the pulp fibers and the superabsorbent polymers are separated from each other (the second and the third separation processes S17, S18 (the second and the third separation devices 17, 18), whereby the pulp fibers and the superabsorbent polymers can be easily recovered from the used absorbent articles. At this time, the number of processes of separating the pulp fibers and superabsorbent polymers, and the other materials can be reduced, whereby the treatment efficiency can be improved.

The second separation process S17 is performed by the second separation device 17. The acidic aqueous solution which includes the pulp fibers and the superabsorbent polymers delivered from the third dust removal device 16, that is, the mixed solution 96, is separated into the pulp fibers within the acidic aqueous solution and the superabsorbent polymers within the acidic aqueous solution by a drum screen. As a result, the acidic aqueous solution which includes the superabsorbent polymers is separated from the mixed solution 96 by passing through the drum screen and is delivered from the second separation device 17 (the mixed solution 97). The acidic aqueous solution which includes the pulp fibers among the mixed solution 96 cannot pass through the drum screen, and is delivered from the second separation device 17 through another route. The superabsorbent polymers which could not be separated remain in the pulp fibers within the acidic aqueous solution of the mixed solution 97. The superabsorbent polymers can be separated from the separated superabsorbent polymers and the acidic aqueous solution by a screen separating machine, etc., whereby the superabsorbent polymers can be recovered.

The hole punching process S11 to the second separation process S17 may be regarded as the processes of preparing the inactivation aqueous solution (for example: the acidic aqueous solution) which includes the pulp fibers and the superabsorbent polymers, that is, the mixed solution 97. Incidentally, the processes of preparing the inactivation aqueous solution which includes the pulp fibers and the superabsorbent polymers are not limited to each of the processes mentioned-above, and may be other processes as long as the inactivation aqueous solution which includes pulp fibers and superabsorbent polymers can be obtained.

The third separation process S18 (the solid-liquid separation process) is performed by the third separation device 18. The pulp fibers which include remaining superabsorbent polymers which could not be separated and the acidic aqueous solution delivered from the second separation device 17, that is the mixed solution 97, are separated into a solid which includes the pulp fibers and the superabsorbent polymers which could not be separated, that is, the mixed matter 98, and a liquid which includes the superabsorbent polymers and the acidic aqueous solution by a drum screen. Further, together with the separation, the superabsorbent polymers within the solid are applied with pressure and are squashed. As a result, the acidic aqueous solution which includes the superabsorbent polymers is separated from the mixed solution 97 by passing through the drum screen and is delivered from the third separation device 18. The pulp fibers in which the superabsorbent polymers are squashed among the mixed solution 97 cannot pass through the drum screen, and are delivered to the outside of the third separation device 18 from the gap G of the lid body 84 at the tip portion of the drum screen (the mixed matter 98).

For example, in the third separation device 18 shown in FIG. 2, first, the mixed solution 97 which includes the pulp fibers, the superabsorbent polymers and the acidic aqueous solution delivered from the second separation device 17 is thrown into the drum screen 81, and reaches the surroundings of the screw shaft 82. The screw shaft 82 rotates by the driving device 86, whereby while the mixed solution 97 in the surroundings of the screw shaft 82 is pressed on and applied pressure with on the side surface of the drum screen 81 by the screw shaft 82 and the screw blades 83, the mixed solution 97 is conveyed toward the tip portion of the drum screen 81. At this time, the superabsorbent polymers and the acidic aqueous solution pass through the screen on the side surface of the drum screen 81, whereby the same are separated from the mixed solution 97, and the pulp fibers and a portion of the superabsorbent polymers remain inside the drum screen 81. That is, the mixed matter 98 which is the solid which includes the pulp fibers and the superabsorbent polymers, and the liquid E which includes the superabsorbent polymers and the acidic aqueous solution are separated from the mixed solution 97. Further, while being applied with pressure, the mixed matter 98 is delivered forcibly from the gap G between the tip portion of the drum screen 81 and the lid body 84 which is applied with pressure in the opposite direction of the conveying direction of the mixed matter 98. In the process of being conveyed and delivered while being applied with pressure, the superabsorbent polymers within the mixed matter 98 are squashed. On the other hand, the liquid E is delivered from the housing 80. As the pressure which is applied to the lid body 84, for example, from the viewpoint of sufficiently squashing the superabsorbent polymers, 0.01 MPa or more may be mentioned, and although the more the pressure, the more the superabsorbent polymers can be squashed, from the viewpoint of saving energy, 1 MPa or less may be mentioned. By sufficiently squashing the superabsorbent polymers, the time for the oxidizing agent treatment by the oxidizing agent treatment process S19 can be greatly reduced. Further, in a case in which the oxidizing agent treatment process S19 is not performed, and the washing process S21 is performed, in the washing process S21, the superabsorbent polymers can be washed away to some extent.

The oxidizing agent treatment process S19 is performed by the oxidizing agent treatment device 19. The pulp fibers and the squashed superabsorbent polymers in the solid delivered from the third separation device 18 (the mixed matter 98) are treated by an aqueous solution which includes an oxidizing agent. Accordingly, the superabsorbent polymers are subjected to an oxidative decomposition so as to be removed from the pulp fibers. As a result, the superabsorbent polymers which have been attached to the pulp fibers in the mixed matter 98 (for example: which have been remained on the surface of the pulp fibers) are subjected to the oxidative decomposition by an aqueous solution (the treatment solution) which includes an oxidizing agent (for example: ozone), and change into an organic matter with low molecular weight which is soluble in an aqueous solution, whereby are removed from the pulp fibers. The state in which the superabsorbent polymers are subjected to an oxidative decomposition and are changed into an organic matter with low molecular weight which is soluble in an aqueous solution is referred to as a state in which the superabsorbent polymers pass through a screen of 2 mm. Accordingly, impurities such as the superabsorbent polymers, etc., included in the pulp fibers are removed, pulp fibers with high purity can be produced, and sterilization, bleaching, and deodorization of the pulp fibers can be performed by the oxidizing agent treatment. In the present embodiment, ozone is used as the oxidizing agent.

For example, the oxidizing agent treatment device 19 shown in FIG. 3 performs, as the oxidizing agent treatment process S19, the pretreatment supply process S19-1a, the pre-treatment process S19-1b, and the pretreatment solution transfer process S19-1c, in the pretreatment device 19-1, and further performs the supply process S19-2a and the treatment process S19-2b, in the treatment device 19-2.

The pretreatment supply process S19-1a supplies the mixed matter 98 to the inside of the pretreatment solution P1 within the pretreatment tank 101. The pretreatment process S19-1b reduces the superabsorbent polymers of the mixed matter 98 by, inside the pretreatment tank 101, emitting the gaseous substance Z1 by the gaseous substance emission portion 102a, from below the mixed matter, toward the mixed matter 98 which is present inside the pre-treatment solution P1 separate from the bottom portion of the pretreatment tank 101. The pre-treatment solution transfer process S19-1c extracts at least a portion of the pretreatment solution P1 which includes the mixed matter 98 in which the superabsorbent polymers have been reduced in the pretreatment process S19-1b from the lower portion of the pretreatment tank 101, so as to transfer the extracted pretreatment solution P1 from the upper portion of the pretreatment tank 101 to the treatment solution P2.

The specific configurations are as follows.

In the pretreatment supply process S19-1a, the mixed matter 98 which includes the pulp fibers which includes the superabsorbent polymers separated by the third separation process S18 is added with water, so as to be an aqueous solution. The aqueous solution is supplied to the inside of the pretreatment solution P from the supply port 101a at the upper portion of the pretreatment tank 101 by the pump 121 through the pipes 131, 132 (V1 opened, and V2 closed).

Subsequently, in the pretreatment process S19-1b, the pretreatment solution P1 is an acidic aqueous solution, and the specific gravity thereof is approximately 1. Accordingly, the pulp fibers sink from the upper portion of the pretreatment solution P1 toward the lower portion. On the other hand, the gaseous substance Z which includes ozone generated by the gaseous substance generation portion 102b is emitted from the gaseous substance emission portion 102a to the pretreatment tank 101 through the pipe 133. The gaseous substance Z1 is emitted continuously from the vicinity of the lower portion of the pretreatment tank 101 to the inside of the pretreatment solution P1 in a state of fine bubbles (for example: microbubbles or nanobubbles), and rises from the lower portion of the pretreatment solution P1 toward the upper portion. Inside the pretreatment solution P1, the pulp fibers which sink from the upper portion toward the lower portion and the gaseous substance Z1 which rises from the lower portion toward the upper portion collide while traveling with facing each other. Further, the gaseous substance Z1 is attached to the surface of the pulp fibers so as to wrap the pulp fibers. At this time, the ozone in the gaseous substance Z1 reacts with the superabsorbent polymers in the pulp fibers, performs oxidative decomposition for the superabsorbent polymers, and makes the superabsorbent polymers dissolve in the pretreatment solution P1. Since there is countercurrent, the contacting probability of the superabsorbent polymers included in the pulp fibers and the gaseous substance Z1 can be greater. Accordingly, the superabsorbent polymers in the pulp fibers are reduced, and the viscosity of the pulp fibers which include the superabsorbent polymers are lowered. Therefore, in the treatment process S19-2b at the later stage, the ejector 107 can be prevented from being clogged by the pulp fibers which include the superabsorbent polymers.

Subsequently, in the pretreatment solution transfer process S19-1c, at least a portion of the pretreatment solution P1 which includes the mixed matter 98 in which the superabsorbent polymers are reduced in the pretreatment process S19-1b is withdrawn from the delivery port 101c at the lower portion of the pretreatment tank 101 through the pipe 135 by the pump 122, so that the withdrawn pretreatment solution P1 is supplied from the supply port 105a at the upper portion of the treatment tank 105 to the inside of the treatment solution P2. Incidentally, the ozone of the gaseous substance Z1 which includes ozone accumulated in the upper portion of the pretreatment tank 101 is decomposed, detoxified, and released to the outside by the gaseous substance decomposition device 103.

It should be noted that the pretreatment supply process S19-1a may include a process of extracting at least a portion of the pretreatment solution P1 which includes the mixed matter, from the lower portion of the pretreatment tank 101, so as to supply the extracted pre-treatment solution P1 from the upper portion of the treatment tank 101 to the pretreatment solution P1. To be specific, at least a portion of the pretreatment solution P1 which includes the mixed matter is withdrawn from the delivery port 101b at the lower portion of the pretreatment tank 101 through the pipe 132 (V1 closed, and V2 opened) by the pump 121, and the withdrawn pre-treatment solution P1 is supplied from the supply port 101a at the upper portion of the pretreatment tank 101 to the inside of the pretreatment solution P1.

The supply process S19-2a supplies the gaseous substance Z2 to the suction fluid supply port AI of the ejector 107, while supplying the aqueous solution which includes the mixed matter 98 to the drive fluid supply port DI of the ejector 107. The treatment process S19-2b discharges the mixed solution 98L in which the aqueous solution and the gaseous substance Z2 are mixed inside the ejector 107 from the mixed fluid discharge port CO of the ejector 107 which is connected to the lower portion of the treatment tank 105 to the inside of the treatment solution P2 within the treatment tank 105, so as to reduce the superabsorbent polymers within the mixed matter 98.

The specific configurations are as follows. In the pretreatment solution transfer process S19-1c, at least a portion of the pretreatment solution P1 which includes the mixed matter 98 in which the superabsorbent polymers are reduced is supplied to the inside of the treatment solution P2 of the treatment tank 105, and while the mixed matter 98 sinks to the treatment solution P2, the mixed matter 98 is included in the treatment solution P2. The treatment solution P2 is an acidic aqueous solution (for the purpose of suppressing the deactivation of ozone, and of inactivating the superabsorbent polymers), and the specific gravity thereof is approximately 1.

In the supply process S19-2a, at least a portion of the treatment solution P2 which includes the mixed matter 98 is withdrawn from the lower portion of the treatment tank 105, and the withdrawn treatment solution P2 is supplied to the drive fluid supply port DI as an aqueous solution. That is, at least a portion of the treatment solution P2 which includes the pre-treatment solution P1 which includes the mixed matter 98 is withdrawn from the delivery port 105b at the lower portion of the treatment tank 105 by the pump 123 through the pipe 136, and the withdrawn treatment solution P2 is supplied to the drive fluid supply port DI of the ejector 107 as an aqueous solution. Further, the gaseous substance Z2 which includes ozone generated by the gaseous substance supply device 106 is supplied to the suction fluid supply port AI of the ejector 107 through the pipe 137.

In the subsequent treatment process S19-2b, the mixed solution 98L which is generated by the treatment solution P2 which includes the mixed matter 98 and the gaseous substance Z2 being mixed at the ejector 107 is discharged from the mixed fluid discharge port CO to the treatment solution P2 inside the treatment tank 105. At this time, the treatment solution P2 which includes the mixed matter 98 and the gaseous substance Z2 are mixed at an extremely narrow region inside the ejector 107, whereby the mixed solution 98L in which the mixed matter 98 of the pulp fibers and superabsorbent polymers and the gaseous substance Z2 are brought to extremely close contact with each other can be formed. Further, the mixed solution 98L is discharged to the inside of the treatment solution P2 within the treatment tank 105, whereby the treatment solution P2 can be stirred. Still further, when the gaseous substance Z2 is discharged to the treatment solution P2, the gaseous substance Z2 is continuously discharged in a state of fine bubbles (for example: microbubbles or nanobubbles), whereby the gaseous substance Z2 can be diffused extremely widely inside the treatment solution P2. Accordingly, the contacting probability of the superabsorbent polymers included in the pulp fibers inside the treatment tank 105, and ozone which is included in the gaseous substance Z2 can be extremely greater. Therefore, the superabsorbent polymers in the pulp fibers can be removed.

Thereafter, at least a portion of the treatment solution P2 which includes the pulp fibers in which the superabsorbent polymers have been removed in the treatment process S19-2b is withdrawn from the delivery portion 105d at the lower portion of the treatment tank 105 through the pipe 139 by the pump 124, and the withdrawn treatment solution P2 is transferred to the equipment at the later stage as the mixed solution 99. Incidentally, the ozone of the gaseous substance Z2 which includes ozone accumulated in the upper portion of the treatment tank 105 is decomposed, detoxified, and released to the outside by the gaseous substance decomposition device 108.

In a case in which the gaseous substances Z1, Z2 which include ozone are supplied to the pretreatment solution P1, and the treatment solution P2, respectively, as the ozone concentration within the pretreatment solution P1 and the treatment solution P2, for example, 1 to 50 mass ppm may be mentioned. As the ozone concentration within the gaseous substances Z1 and Z2, for example, 40 to 200 g/cm$^3$ may be mentioned. As the concentration of the pulp fibers (which include the superabsorbent polymers) within gaseous substances Z1 and Z2, for example, 0.1 to 20 mass % may be mentioned. As the time during which the pulp fibers are present within the pretreatment tank 101 and the treatment tank 105, for example, 2 to 60 minutes may be mentioned. The gaseous substances Z1, Z2 are preferably microbubbles or nanobubbles, and are supplied to the inside of the pretreatment solution P1, and the treatment solution P2. The bubbles of microbubbles have a diameter of approximately 1 to 1000 μm, and the bubbles of nanobubbles have a diameter of approximately 100 to 1000 nm. The microbubbles or nanobubbles are fine bubbles, have a large surface area per unit volume, and the rising speed in solution is slow, whereby the probability of the bubbles coming into contact with the pulp fibers can be increased, and the bubbles can come into contact with the surfaces of a large amount of pulp fibers. Accordingly, the pulp fibers can be wrapped evenly by the fine bubbles, and the contacting area of the pulp fibers and the gaseous substance can be further increased. Further, by the buoyant force of the bubbles, the sinking speed of the pulp fibers which include the superabsorbent polymers can be lowered, and the contacting time of the pulp fibers and the gaseous substance can be further increased. Accordingly, the superabsorbent polymers which are included in the pulp fibers can be subjected to the oxidative decomposition more reliably so as to be removed from the pulp fibers.

It should be noted that in a case in which the oxidizing agent is ozone, by using an acidic aqueous solution as the treatment solution, the deactivation of ozone can be suppressed, and the effects of ozone (the oxidative decomposition of the superabsorbent polymers, sterilization, bleaching, deodorization) can be improved. In addition to the inactivation of the superabsorbent polymers, in a case in which the acidic aqueous solution is used in the crushing process and in the dust removal process, since there is a continuity between each of the processes, there is no risk that any inconvenience occurs by the aqueous solution in each of the processes being different, whereby the treatment can be performed stably and reliably. Still further, from the viewpoint of reducing influence on the workers and to the devices by acid, an organic acid among the acidic aqueous solution is preferable, and among the organic acid, citric acid is preferable from the viewpoint of removing metal.

The fourth separation process S20 is performed by the fourth separation device 20, and the treatment solution which includes the pulp fibers that have been treated by the oxidizing agent treatment device 19, that is, the mixed solution 99, passes through a screen with a plurality of openings, whereby the pulp fibers and the treatment solution are separated from the mixed solution 99. As a result, the treatment solution P2 passes through a screen so as to be separated from the mixed solution 99, and is delivered from the fourth separation device 20. On the other hand, the pulp fibers among the mixed solution 99 cannot pass through the screen and remain in the fourth separation device 20 or is delivered through another route.

The washing process S21 (the removal process) is performed by the washing device 21, and the pulp fibers (the mixed matter 100) which has been separated by the fourth separation device 20 are washed within liquid (for example: water) and the impurities which are attached to the pulp fibers are washed away, whereby recycled pulp fibers, that is, the pulp fibers for saccharification are generated. It should be noted that in the washing process S21, the solid (the mixed matter 98) which includes the pulp fibers which is obtained by the third separation device 18 may be supplied without going through the oxidizing agent treatment process S19 and the fourth separation process S20, so as to be washed, etc., within the liquid. The superabsorbent polymers which are attached to the pulp fibers obtained by the third separation process S18 are mostly removed from the pulp fibers by the washing, etc. Accordingly, in the washing process S21, the solid (the mixed matter 98) which includes the pulp fibers which is obtained by the third separation device 18 is washed, etc., within a liquid, whereby the superabsorbent polymers are washed away, and the recycled pulp fibers, that is, the pulp fibers for saccharification are generated. The superabsorbent polymers which are included in the recycled pulp fibers, that is, the pulp fibers for saccharification to be generated are 10 mass % or less of the pulp fibers for saccharification. In a case in which the method moves on to the washing process S21 after the third separation process S8, the pressing to the lid body 84 of the third separation device 18 may be applied stronger, whereby the superabsorbent polymers which are included in the pulp fibers for saccharification can be further reduced, so as to be 5 mass % or less. Further, in a case in which the method moves on to the washing process S21 after the third separation process S8, the oxidizing agent treatment process S19, and the fourth separation process S20, even at the stage before the washing process S21, the superabsorbent polymers which are included in the pulp fibers for saccharification can be made to be substantially 0 mass %.

The saccharification process S22 is performed, for example, by the saccharification device 22. After the washing process S21 (the removal process), the recycled pulp fibers, that is, the pulp fibers for saccharification, are saccharified, whereby the saccharification solution is generated. The saccharification process S22 is not particularly limited, and includes a saccharification method publicly known in the technical field. As the above-mentioned saccharification method, for example, methods described in Japanese Unexamined Patent Publication No. 2006-141244, Japanese Unexamined Patent Publication No. 2009-183211, Japanese Unexamined Patent Publication No. 2010-17084, Japanese Unexamined Patent Publication No. 2010-36058, and Japanese Unexamined Patent Publication No. 2013-202021, etc., may be mentioned. When pulp fibers for saccharification in which the superabsorbent polymers are 10 mass % or less of the pulp fibers for saccharification are used, the recovery rate of the saccharification solution and the sugar recovery rate can be improved.

Note that the proportion of the superabsorbent polymers in the pulp fibers which include the superabsorbent polymers was measured in the following manner. First, the pulp fibers which include the superabsorbent polymers were absolutely dried by the predetermined absolute drying method (a method of heating and drying a sample at 120° C. for 10 minutes), and the absolute dry weight W1 of the obtained absolutely dried matter was measured. Next, the absolutely dried matter was immersed in an aqueous solution which includes ozone, the obtained matter is absolutely dried by the above-mentioned absolute drying method, and the absolute dry weight W2 as the pulp fibers was measured. Further, the weight obtained by subtracting the absolute dry weight W2 from the absolute dry weight W1 was regarded as the weight of the superabsorbent polymers, and the proportion of the superabsorbent polymers in the pulp fibers which include the superabsorbent polymers was calculated by the following formula. That is, (the proportion of the superabsorbent polymers)=(the absolute dry weight W1−the absolute dry weight W2)/(the sample weight W1).

Note that the ozone concentration within the aqueous solution was measured by the following manner. First, 85 mL of an aqueous solution in which ozone was dissolved is put into 100 mL graduated cylinder in which approximately 0.15 g of potassium iodide and 5 mL of 10% citric acid solution were placed. After the reaction, the same was transferred to 200 mL Erlenmeyer flask. A starch solution was added therein so that the color was changed to purple, and thereafter, the titration was performed with 0.01 mol/L sodium thiosulfate while stirring until the solution became colorless. By using the following formula based on the titration value, the ozone concentration within the aqueous solution was calculated. The ozone concentration within the aqueous solution (mass ppm)=0.01 mol/L sodium thiosulfate (mL) required for the titration×0.24×0.85 (mL).

The present method (the system 1) includes, in the recovery process of recovering the pulp fibers, etc., (the second separation process S17 (the second separation device 17) to the washing process S21 (the washing device 21)), at least the solid-liquid separation process (the solid-liquid separation device), that is, the third separation process S8 (the third separation device 18), and the removal process (the removal device), that is, the washing process S21 (the washing device 21). Further, in the third separation process S8 (the third separation device 18), the superabsorbent polymers which have absorbed water in a gel-like (lumpy or substantially spherical) state remaining in the pulp fibers are squashed, whereby the superabsorbent polymers are thinned and subdivided so that it is easier to be removed from the pulp fibers. Accordingly, in the washing process S21 (the washing device 21), the superabsorbent polymers which remain in the pulp fibers can be relatively easily washed away by a liquid (for example: water). Therefore, the superabsorbent polymers can be efficiently reduced from the pulp fibers, whereby pulp fibers for saccharification in which the amount of superabsorbent polymers (impurities) is small and with high purity can be efficiently manufactured. By manufacturing the saccharification solution by using such pulp fibers for saccharification in which the amount of superabsorbent polymers is small, there is hardly a risk that the superabsorbent polymers may adversely affect the saccharification reaction, and it is not necessary to remove the superabsorbent polymers after the generation of the saccharification solution, and therefore the recovery efficiency of the saccharification solution can be improved.

As a preferred aspect of the embodiment, the third separation process S18 (the third separation device 18) may include a squashing process (a screw press dehydrating machine) of squashing the superabsorbent polymers which remain in the pulp fibers by treating the inactivation aqueous solution (for example: an acidic aqueous solution) which includes the pulp fibers and the superabsorbent polymers by a pressure type dehydration method.

According to the present method or system, the superabsorbent polymers which remain in the pulp fibers are squashed by the pressure type dehydration method, whereby the solid-liquid separation and the squashing of the superabsorbent polymers on the pulp fibers can be performed simultaneously, efficiently, and reliably. That is, the present method or system thins and subdivides the superabsorbent polymers on the pulp fibers efficiently and reliably, whereby it is easier to be removed from the pulp fibers. Accordingly, the superabsorbent polymers can be reduced from the pulp fibers more efficiently.

A preferred aspect of the embodiment may further comprise a process of separating a portion of the superabsorbent polymers and the inactivation aqueous solution from the inactivation aqueous solution which includes the pulp fibers and the superabsorbent polymers, that is, the second separation process S17 (the second separation device 17), before the third separation process S18 (the third separation device 18).

According to the present method or system, before the third separation process S18 (the third separation device 18), a certain amount of the superabsorbent polymers and the inactivation aqueous solution is separated from the inactivation aqueous solution which includes the pulp fibers and the superabsorbent polymers. Accordingly, the present method or system can suppress the proportion of the superabsorbent polymers in the materials (the pulp fibers, the superabsorbent polymers, and the inactivation aqueous solution) to be supplied to the third separation process S18 (the third separation device 18) in a low degree. Consequently, the superabsorbent polymers which may remain in the pulp fibers can be reduced before the third separation process S18 (the third separation device 18). Therefore, in the third separation process S18 (the third separation device 18), the superabsorbent polymers which are attached to the pulp fibers can be squashed more efficiently, and the treatment efficiency of removing the superabsorbent polymers from the pulp fibers can be improved.

A preferred aspect of the embodiment may further comprise, before the third separation process S18 (the third separation device 18), a process of crushing the used absorbent articles within the inactivation aqueous solution (including S12), and a process of separating the inactivation aqueous solution which includes the pulp fibers and the superabsorbent polymers from the inactivation aqueous solution which includes crushed matter obtained by the process (including S12) of crushing the used absorbent articles (including S13, and preferably including S14 to S16).

According to the present method or system, the inactivation aqueous solution which includes the pulp fibers and the superabsorbent polymers which are separated from the used absorbent articles, and is supplied in the third separation process S18 (the third separation device 18), is generated by the process of crushing and the process of separating. Accordingly, foreign matter (materials other than the pulp fibers and the superabsorbent polymers of the disposable absorbent articles (for example: films, nonwoven fabric, elastic bodies) can be suppressed from being mixed into the inactivation aqueous solution. Therefore, the superabsorbent polymers can be squashed more accurately without being disturbed by foreign matter. As a result, the treatment efficiency of removing the superabsorbent polymers from the pulp fibers can be improved.

A preferred aspect of the embodiment may further comprise, between the third separation process S18 (the third separation device 18) and the washing process S21 (the washing device 21), the oxidizing agent treatment process S19 (the oxidizing agent treatment device 19) of removing the squashed superabsorbent polymers from the pulp fibers by treating the separated solid with an aqueous solution which includes an oxidizing agent.

According to the present method or system, in the third separation process S18 (the third separation device 18), the superabsorbent polymers in a gel-like (lumpy or substantially spherical) state remaining in the pulp fibers are squashed, whereby the superabsorbent polymers are thinned and subdivided so that the surface area of the superabsorbent polymers can be expanded, and the inside of the superabsorbent polymers in a lumpy or substantially spherical state can be exposed to the outer side. Accordingly, in the oxidizing agent treatment process S19 (the oxidizing agent treatment device 19), the contacting area of the superabsorbent polymers with the oxidizing agent can be increased for example by making the inside of the superabsorbent polymers which is difficult to come into contact with the oxidizing agent in the case of the superabsorbent polymers in a lumpy or substantially spherical state, come into contact with the oxidizing agent. Therefore, the oxidative decomposition of the superabsorbent polymers by the oxidizing agent can be proceeded more efficiently, whereby the superabsorbent polymers can be reduced from the pulp fibers more efficiently. Thus, pulp fibers for saccharification in which the amount of superabsorbent polymers (impurities) is small and with high purity can be manufactured more efficiently. It should be noted that as the oxidizing agent, ozone, chlorine dioxide, peracetic acid, sodium hypochlorite, hydrogen peroxide, etc., may be mentioned. Using an oxidizing agent can also perform sterilization, and thus is preferable.

As a preferred aspect of the embodiment, the oxidizing agent may be ozone.

According to the present method or system, the oxidizing agent is ozone, whereby the oxidative decomposition of the superabsorbent polymers can be proceeded more strongly, and pulp fibers for saccharification in which the amount of superabsorbent polymers (impurities) is small and with high purity can be manufactured more efficiently. Further, effects such as sterilization, bleaching, and deodorization are brought by ozone, whereby impurities other than the superabsorbent polymers can be removed from the pulp fibers, and pulp fibers for saccharification with higher purity can be manufactured more efficiently.

As a preferred aspect of the embodiment, the inactivation aqueous solution may be an acidic aqueous solution.

According to the present method or system, the inactivation aqueous solution is an acidic aqueous solution, whereby the superabsorbent polymers within the used absorbent articles can be reliably dehydrated, so as to have a predetermined particle diameter or smaller. Accordingly, in the third separation process S18 (the third separation device 18), while performing the solid-liquid separation easily, the superabsorbent polymers can be squashed. As a result, the superabsorbent polymers can be reduced from the pulp fibers more efficiently.

A preferred aspect of the embodiment may further comprise, after the washing process S21 (the washing device 21), a saccharification process of manufacturing a saccharification solution by saccharifying the pulp fibers for saccharification.

According to the present method or system, the pulp fibers for saccharification which are manufactured at least by the above-mentioned the third separation process S18 (the third separation device 18) and the washing process S21 (the washing device 21) are saccharified, whereby the saccharification solution is manufactured. That is, the saccharification solution is manufactured by using the pulp fibers for saccharification in which the amount of superabsorbent polymers (impurities) is small, whereby there is hardly a risk that the superabsorbent polymers may adversely affect the saccharification reaction, and it is not necessary to remove the superabsorbent polymers after the generation of the saccharification solution, and therefore the recovery efficiency of the saccharification solution can be improved.

A preferred aspect of the embodiment includes the oxidizing agent treatment process S19 (the oxidizing agent treatment device 19). Further, the oxidizing agent treatment process S19 (the oxidizing agent treatment device 19) includes at least the supply process S19-2a and the treatment process S19-2b (the treatment device 19-2). In the supply process S19-2a and the treatment process S19-2b (the treatment device 19-2), the aqueous solution (which includes the mixed matter 98 which includes the superabsorbent polymers and pulp fibers) which is a drive fluid, and the gaseous substance Z2 which is a suction fluid are supplied to the ejector 107, so as to be mixed inside the ejector 107, whereby the mixed solution 98L which is a mixed fluid in which the aqueous solution and the gaseous substance Z2 are well mixed can be formed efficiently. At this time, the mixed matter 98 of the pulp fibers and superabsorbent polymers and the gaseous substance Z2 can be made to be in an extremely close contact with each other. Further, the mixed solution 98L is discharged into the treatment solution P2 inside the treatment tank 105, whereby the treatment solution P2 can be stirred. Still further, when the gaseous substance Z2 is discharged into the treatment solution P2, the gaseous substance Z2 is discharged in a continuous manner in a state of fine bubbles, whereby can be diffused extremely widely inside the treatment solution P2. Accordingly, the reaction of the superabsorbent polymers and the gaseous substance Z2 can be made to proceed extremely efficiently not only for the pulp fibers which include the superabsorbent polymers inside the mixed solution 98L to be discharged from the ejector 107 but also for the pulp fibers which include the superabsorbent polymers within the treatment solution inside the treatment tank 105. Further, the superabsorbent polymers within the mixed matter 98 are oxidatively decomposed in a suitable manner so as to dissolve into the treatment solution P2 and to be removed, and further, the unevenness in the treatment of pulp fibers can be suppressed. Accordingly, the purity of the regenerated pulp fibers, that is, the recycled pulp fibers can be improved, and recycled pulp fibers which can be reused easily can be manufactured. Therefore, it becomes possible to manufacture the recycled pulp fibers efficiently while suitably removing the superabsorbent polymers from the pulp fibers.

As mentioned above, in the supply process S19-2a and the treatment process S19-2b (the treatment device 19-2), the close contact of the pulp fibers to which the superabsorbent polymers are attached and the gaseous substance, the stirring of the treatment solution by the mixed solution 98L, and the wide diffusion of the bubbles, etc., function effectively for the removal of the superabsorbent polymers. Accordingly, in comparison to the pretreatment process S19-1b (the pretreatment device 19-1), the treatment process S19-2b (the treatment device 19-2) has a higher treatment efficiency. It should be noted however that when the amount of the superabsorbent polymers attached to the pulp fibers is large, it is conceivable that the viscosity of the mixed matter 98 is relatively high by the superabsorbent polymers. In such a case, when the aqueous solution which includes the mixed matter 98 to be supplied to the oxidizing agent treatment process S19 (the oxidizing agent treatment device 19) is supplied directly to the treatment device 19-2, it is conceivable that the ejector 107 is clogged by the mixed matter 98. Accordingly, in order to deal with such an issue, in the present embodiment, before the supply process S19-2a and the treatment process S19-2b (the treatment device 19-2), the superabsorbent polymers which are attached to the pulp fibers in the mixed matter 98 are reduced by the pretreatment process S19-1b (the pretreatment device 19-1). To be specific, the mixed matter 98 within the aqueous solution supplied to the drive fluid supply port DI in the supply process S19-2a is made to come into contact with the gaseous substance for pretreatment Z1 (for example: ozone gas) in the pretreatment process S19-1b, before the supply process S19-2a. Accordingly, before the supply process S19-2a, the superabsorbent polymers are oxidatively decomposed to some extent so as to dissolve into the pretreatment solution P1 and to be removed. That is, in the pretreatment process S19-1b, the superabsorbent polymers within the mixed matter 98 can be reduced to some extent. Further, in the present embodiment, a portion of the pretreatment solution P1 after the pretreatment process S19-1b is transferred to the treatment solution P2, whereby the superabsorbent polymers within the mixed matter 98 can be reduced also in the treatment solution P2, before the mixed matter 98 is supplied to the drive fluid supply port DI of the ejector 107. Accordingly, in the treatment process S19-2b, the ejector 107 can be suppressed from being clogged with the mixed matter 98 within the aqueous solution, that is, the pulp fibers and superabsorbent polymers. Therefore, even when the amount of the mixed matter 98 within the aqueous solution is increased, the mixed solution 98L of the mixed matter 98 and the gaseous substance Z2 is formed so as to be stably discharged into the treatment tank 105. Thus, it is possible to increase the mixed matter 98 within the aqueous solution which can be treated by the treatment process S19-2b and to manufacture the recycled pulp fibers more efficiently.

Incidentally, in a case in which the amount of the mixed matter 98 to be treated is large, a plurality of ejectors 107 (and the pump 123 and the pipe 136) may be provided in the treatment tank 105. Even in such a case, the above-mentioned effect of efficiently manufacturing the recycled pulp fibers can be exhibited, and a larger amount of the mixed matter 98 can be treated, whereby the treatment efficiency can be improved in a greater degree. Further, when a plurality of ejectors 107 are provided in the treatment tank 105, the amount of the mixed matter 98 to be supplied to one ejector 107 can be reduced, whereby even in a case in which the viscosity of the mixed matter 98 is high, the pretreatment supply process S19-1a and the pretreatment process S19-1b (the pretreatment device 19-1) can be omitted.

EXAMPLES

Hereinbelow, examples are explained. In the present examples, by using imitated recycled pulp fibers in which recycled pulp fibers deriving from used absorbent articles are imitated, the relationship between the remaining rate of the inactivated superabsorbent polymers in the recycled pulp fibers and the saccharification was measured.
(1) Imitated Recycled Pulp Fibers In order to imitate the recycled pulp fibers which were obtained by performing the washing process S21 without going through the oxidizing agent treatment process S19 after the third separation process S18, the imitated inactivated superabsorbent polymers and the imitated pulp fibers were formed in the following manner.

First, the superabsorbent polymers which had not absorbed water and 1% citric acid aqueous solution as the inactivation aqueous solution were prepared. Further, the 1% citric acid aqueous solution with 9 times as much volume as the volume of the superabsorbent polymers were made to be absorbed by the superabsorbent polymers, whereby 10% inactivated superabsorbent polymers were prepared. Thereafter, the 10% inactivated superabsorbent polymers were squashed by a homogenizer (model number: AHG-160D, manufactured by AS ONE Corporation) until the same became into a paste state, and were regarded as the imitated inactivated superabsorbent polymers. On the other hand, virgin pulp was prepared, and was regarded as the imitated pulp fibers. Further, the imitated inactivated superabsorbent polymers were prepared so that the remaining rates of the imitated inactivated superabsorbent polymers (converted to non-water absorbed state) with respect to 10 g of virgin pulp were 0, 1, 5, 10, 20, and 30%. The combinations of the imitated pulp fibers and the imitated inactivated superabsorbent polymers can be regarded as the imitated recycled pulp fibers in which the recycled pulp fibers, the remaining rate of the superabsorbent polymers (converted to non-water absorbed state) of which were 0, 1, 5, 10, 20, and 30%, respectively, were imitated.
(2) Saccharification A 250 mL citric acid buffer solution as a solvent, imitated recycled pulp fibers, that is, imitated pulp fibers and imitated inactivated superabsorbent polymers as a solute, and Ctec2 (liquid: manufactured by Novozymes A/S) as an enzyme were prepared.

Further, in the solvent placed in a container, 10 g of the imitated pulp fibers, the imitated inactivated superabsorbent polymers equivalent to a predetermined mass % with respect to the imitated pulp fibers, and 1.0 g of Ctec2 were added and stirred so that samples were generated. Thereafter, the container was wrapped with a wrap film and was placed still at 50° C., and the pH and the glucose concentration of each of the samples were measured every 24 hours. Subsequently, each of the samples after 168 hours having been lapsed was placed in a nylon mesh (N-NO. 250HD: manufactured by NBC Meshtec. Inc.) and was centrifuged at 150 G (rotation number of 850 rpm) by using a centrifugal separator (the separator HI30: manufactured by Kokusan Co., Ltd.). The amount of the obtained residue was measured, and the recoverable amount of sugar solution was estimated by subtracting the same from the total charged amount of the solvent, the imitated pulp fibers, the imitated inactivated superabsorbent polymers, and the enzyme. The glucose concentration of the recovered sugar solution was measured by using the glucose meter (GF-501-H: manufactured by TANITA corporation). The recoverable glucose amount was calculated from the products of the glucose concentration and the estimated sugar solution recovery amount. Incidentally, as the glucose concentration, the maximum amount during the measurement period was adopted. The sugar solution recovery rate was defined as the sugar solution recovery amount for all charged amounts, and the sugar recovery rate was defined as the recoverable glucose amount for the theoretical amount in which all pulp fibers were converted to glucose. To be specific, the sugar recovery rate was calculated by the formula of ((glucose amount (g)))/((charged amount of imitated pulp fibers: 10 (g))×1.1)×100. The sample in which the remaining rate of the imitated inactivated superabsorbent polymers was 0% was set as the blank, and the sugar solution recovery rate and the sugar recovery rate of the samples with the predetermined remaining rate of the imitated inactivated superabsorbent polymers and the sample which was set as the blank were compared, whereby the minimum amount of the concentration of the imitated inactivated superabsorbent polymers which did not affect the saccharification reaction and which can be mixed was searched.
(3) Results Table 1 shows the influences of the inactivated superabsorbent polymers (the imitated inactivated superabsorbent polymers) which remain in the pulp fibers (the imitated recycled pulp fibers) on the saccharification. As the remaining rate of the inactivated superabsorbent polymers within the pulp fibers increased, the sugar solution recovery rate decreased. Especially, when the remaining rate exceeded 10%, the sugar solution recovery rate decreased significantly. On the other hand, the sugar recovery rate did not differ much from the blank sample up to a remaining rate of 5%. However, when the remaining rate exceeded 10%, the sugar recovery rate decreased significantly, and when the remaining rate was 20%, it was difficult to perform the saccharification. Accordingly, the remaining rate of the inactivated superabsorbent polymers with respect to the recycled pulp fibers was preferably 10% or less, and was more preferably 5% or less.

TABLE 1

| | Remaining rate of inactivated superabsorbent polymers (%) | | | | |
| --- | --- | --- | --- | --- | --- |
| | 0 | 1 | 5 | 10 | 20 |
| Charged amount (g) | 111 | 111 | 112 | 112 | 114 |
| Residual amount (g) | 7.75 | 10.7 | 15.6 | 27.6 | 69.1 |
| Sugar solution recovery amount (estimated: g) | 103 | 100 | 95.9 | 84.6 | 44.4 |
| Glucose concentration (%) | 7.44 | 8.11 | 8.40 | 7.92 | — |
| Glucose amount (estimated: g) | 7.68 | 8.15 | 8.05 | 6.70 | — |
| Sugar solution recovery rate (%) | 93 | 90 | 86 | 75 | 39 |
| Sugar recovery rate (%) | 70 | 74 | 73 | 61 | — |

The above-mentioned embodiment explains a case in which the configurational member of the back sheet is a film, and the configurational member of the top sheet is a nonwoven fabric. However, an embodiment in a case in which the configurational member of the back sheet is a nonwoven fabric, and the configurational member of the top sheet is a film, or a case in which both of the configurational members of both of the back sheet and the top sheet are films, can also be realized by the similar method as the above-mentioned embodiment, and can exhibit the similar effect.

The absorbent article of the present invention is not limited to the above-described each of the embodiments, and combination or variation, etc., is possible as appropriate, without departing from the scope of the object and the subject matter of the present invention.

REFERENCE SIGNS LIST 98 solid
E liquid
S18 third separation process (solid-liquid separation process)
S21 washing process (removal process)

The invention claimed is:

1. A method of manufacturing pulp fibers for saccharification from pulp fibers of used absorbent articles, comprising:
a first solid-liquid separation process that receives a first inactivation aqueous solution which includes the pulp fibers and superabsorbent polymers which are separated from the used absorbent articles and outputs a mixed solution which includes the pulp fibers and the superabsorbent polymers that could not be removed from the pulp fibers, and a second inactivation aqueous solution, containing superabsorbent polymers,
a second solid-liquid separation process that receives the mixed solution from the first solid-liquid separation process and outputs a third inactivation solution containing superabsorbent polymers and a solid matter which includes pulp fibers and superabsorbent polymers that have been squashed, and removing the squashed superabsorbent polymers from the solid matter by delivering the solid matter to a pre-treatment device that washes the solid matter with a liquid that includes an oxidizing agent to oxidatively decompose the superabsorbent polymers which remain in the pulp fibers and change them into organic matters with low molecular weights which are soluble in the liquid thereby reducing the viscosity of the pulp fibers before delivering the pulp fibers to a treatment device which further reduces the superabsorbent polymers from the pulp fibers.

2. The method according to claim 1, wherein the second solid-liquid separation process includes a squashing process of squashing the superabsorbent polymers which remain in the pulp fibers by treating the inactivation aqueous solution which includes the pulp fibers and the superabsorbent polymers by a pressure type dehydration method.

3. The method according to claim 1, further comprising a process of separating a portion of the superabsorbent polymers and the inactivation aqueous solution from the inactivation aqueous solution which includes the pulp fibers and the superabsorbent polymers before the solid-liquid separation process.

4. The method according to claim 1, further comprising, before the first solid-liquid separation process, a process of crushing the used absorbent articles within the inactivation aqueous solution, and a process of separating the inactivation aqueous solution which includes the pulp fibers and the superabsorbent polymers from the inactivation aqueous solution which includes crushed matter obtained by the process of crushing the used absorbent articles.

5. The method according to claim 1, wherein
the oxidizing agent is ozone.

6. The method according to claim 1, wherein
the inactivation aqueous solution is an acidic aqueous solution.

7. The method according to claim 1, further comprising, after the removal process, a saccharification process of manufacturing a saccharification solution by saccharifying the pulp fibers for saccharification.

* * * * *